United States Patent [19]

Nakamura et al.

[11] Patent Number: 5,128,098
[45] Date of Patent: Jul. 7, 1992

[54] FUEL ASSEMBLY

[75] Inventors: Shozo Nakamura, Hitachiota; Tadashi Mizuno, Kitaibaraki; Junjiro Nakajima; Yoshihiko Yanagi, both of Hitachi; Hajime Umehara, Katsuta; Tetsuo Yasuda, Hitachi; Akira Maru, Ibaraki; Junichi Yamashita, Hitachi; Yuichiro Yoshimoto, Hitachi; Tatsuo Hayashi, Hitachi, all of Japan

[73] Assignee: Hitachi, Ltd., Tokyo, Japan

[21] Appl. No.: 639,256

[22] Filed: Jan. 9, 1991

[30] Foreign Application Priority Data

Feb. 28, 1990 [JP] Japan ................... 2-045423

[51] Int. Cl.$^5$ .............................. G21C 3/32
[52] U.S. Cl. ..................... 376/444; 376/443; 376/439
[58] Field of Search ............ 376/440, 444, 443, 439, 376/203, 204

[56] References Cited

U.S. PATENT DOCUMENTS

| | | |
|---|---|---|
| 4,035,233 | 7/1977 | Williamson et al. ............ 376/440 |
| 4,889,684 | 12/1989 | Johansson ...................... 376/444 |
| 4,970,047 | 11/1990 | Ueda et al. ..................... 376/443 |

*Primary Examiner*—Brooks H. Hunt
*Assistant Examiner*—Meena Chelliah
*Attorney, Agent, or Firm*—Antonelli, Terry, Stout & Kraus

[57] ABSTRACT

A fuel assembly comprises a plurality of fuel rods, a lower tie plate for supporting lower ends of the fuel rods, and a channel box surrounding a bundle of the fuel rods and the circumference of the lower tie plate to thereby define a cooling water leak passage between the lower tie plate and the channel box. The fuel assembly includes a venturi provided in the lower tie plate for generating a force tending to attract the channel box toward the lower tie plate under the action of a leak stream of the cooling water passing through the cooling water leak passage. The fuel assembly also includes an arrangement provided in the lower tie plate for suppressing vibrations of the channel box caused upon an influence of the venturi.

23 Claims, 25 Drawing Sheets

PRESSURE DISTRIBUTION

ELASTIC DEFORMATION OF CHANNEL BOX

FIG. 6
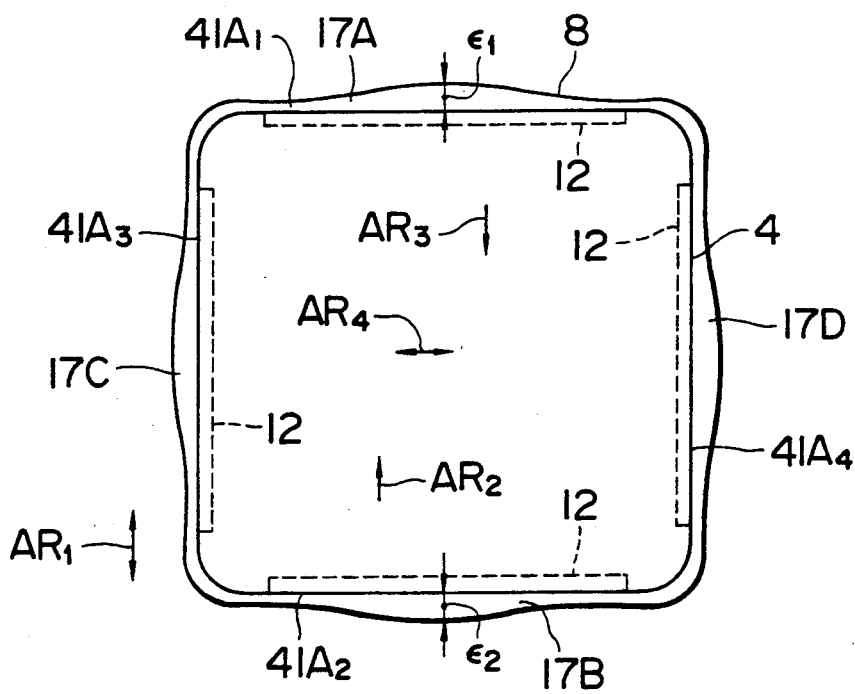
FIG. 7A
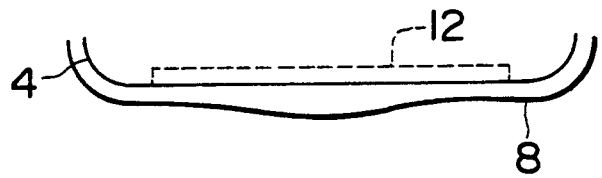
FIG. 7B
FIG. 7C
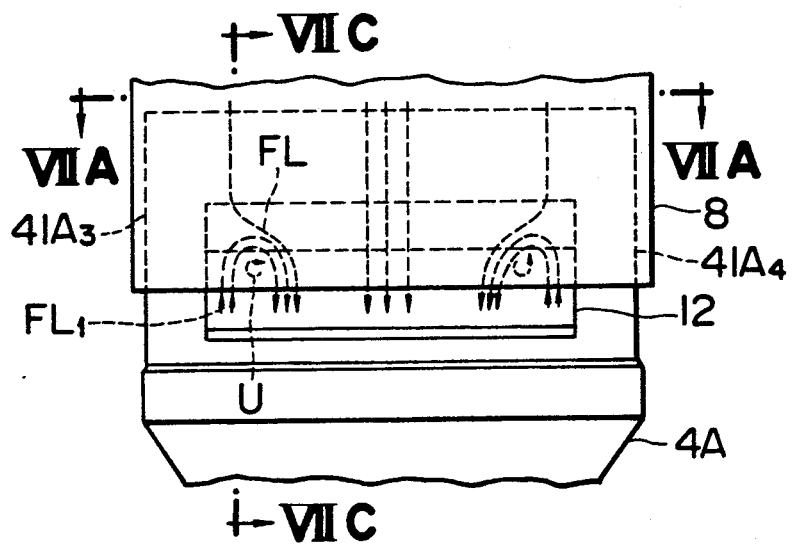

PRESSURE DIFFERENCE ($\Delta P$)
BETWEEN INSIDE AND OUTSIDE
OF CHANNEL BOX

DEGREE OF BURN-UP DURING
OPERATING CYCLE OF REACTOR

MAXIMUM FLEXURE $\delta_{max}$ $L_f = L - 2R$

FUEL ASSEMBLY

BACKGROUND OF THE INVENTION

The present invention relates to a fuel assembly, and more particularly to a fuel assembly suitable for use with boiling water reactors.

A conventional fuel assembly for use with boiling water reactors comprises, as disclosed in JP-A-60-120282, an upper tie plate, a lower tie plate, a plurality of fuel rods fixedly held at their opposite ends by the upper and lower tie plates in the bundle form, a channel box surrounding the bundled fuel rods, and a finger spring attached to the lower tie plate. The finger spring suppresses a leak of cooling water through a gap between the channel box and the lower tie plate. However, a force of the finger spring is exerted on the channel box to push it outwardly. This force accelerates a creep deformation of the channel box at its lower end portion and also spreads a lower portion of the channel box outwardly.

In a fuel assembly disclosed JP-A-54-124183, as with JP-A-60-120282, a leak prevention plate, (corresponding to the finger spring and made of resilient material, is attached to a lower tie plate and is held in contact with a channel box to suppress a leak of cooling water through a gap between the channel box and the lower tie plate. This fuel assembly also raises the similar problem to that in JP-A-60-120282.

With a view of suppressing such a creep deformation of the channel box at its lower end portion, JP-A-61-170692 discloses a structure using no finger spring. With this structure, an inwardly inclined step is provided on the outer peripheral surface of a lower tie plate and a channel box rests on the step. The channel box is closely contacted with the lower tie plate at all times by gravity or its own weight to thereby prevent a leak of the cooling water within the channel box. In addition, because the channel box rests on the inwardly inclined step, an inward component force is produced to act on the lower end portion of the channel box for suppressing an outward deformation of that lower end portion.

Stated otherwise, the fuel assemblies using the finger springs, disclosed in JP-A-60-120282 and JP-A-54-124183, each suffer from the problem that the outward force of the finger spring accelerates an expansion of the channel box at its lower end portion due to creep, and increases a deformation of the channel box.

On the other hand, in the fuel assembly using no finger spring disclosed in JP-A-61-170692, since the lower end of the channel box and the lower tie plate are in close contact with each other at all times, the lower end portion of the channel box undergoes an outward force due to the pressure difference between the inside and outside of the channel box, resulting in accelerated creep. As the lower end portion of the channel box is forced to spread outwardly, the amount of cooling water leaked is necessarily increased in proportion.

In order to suppress the leak flow (rate) of cooling water through the gap between the channel box and the lower tie plate, commonly assigned co-pending U.S. Pat. Application Ser. No. 07/464,151; European Patent Application No. 90300272.3; filed on Jan. 10, 1990) proposed forming a venturi means in that gap without using any finger spring.

SUMMARY OF THE INVENTION

An object of the present invention is to provide a fuel assembly for suppressing the leak flow of coolant through a gap between a channel box and a lower tie plate, and for suppressing vibrations of the channel box.

The fuel assembly of the present invention featured in comprising means for generating a force that acts on a part of the channel box and attracts the channel box toward the lower tie plate, under the action of a leak stream of coolant passing through a coolant leak passage, and means provided on the lower tie plate for suppressing vibrations of the channel box.

As the attraction force generated by the attraction force generating means acts in a direction to attract the channel box toward the lower tie plate, the gap between the lower tie plate and the channel box at a lower end portion of the latter is reduced to suppress the leak flow of coolant through that gap. Furthermore, the provision of the channel box vibration suppressing means makes it possible to suppress vibrations of the channel box that would be produced with the attraction force acting on the channel box.

BRIEF DESCRIPTION OF THE DRAWINGS

FIG. 6 is a schematic view for explaining one of factors causing vibrations of the channel box in the fuel assembly of FIG. 1;

FIGS. 7A, 7B and 7C are views for explaining another factor causing vibrations of the channel box in the fuel assembly of FIG. 1; in which FIG. 7A is a sectional view taken along the line VIIA—VIIA in FIG. 7B and FIG. 7C is a sectional view taken along the line VIIC—VIIC in FIG. 7B;

FIG. 26 is an enlarged perspective view of a part of a fuel assembly constructed in accordance with the present invention;

FIG. 30 is an enlarged perspective view of a part of a fuel assembly constructed in accordance with the present invention;

DETAILED DESCRIPTION OF THE PREFERRED EMBODIMENTS

The present invention has been made on the basis of the result of studies as follows.

Figure 1:
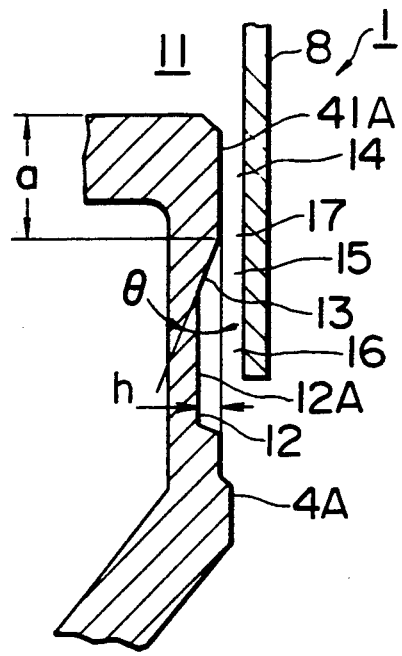
FIG. 1 is a vertical sectional view of a fuel assembly in the vicinity of a lower tie plate.
Figure 2:
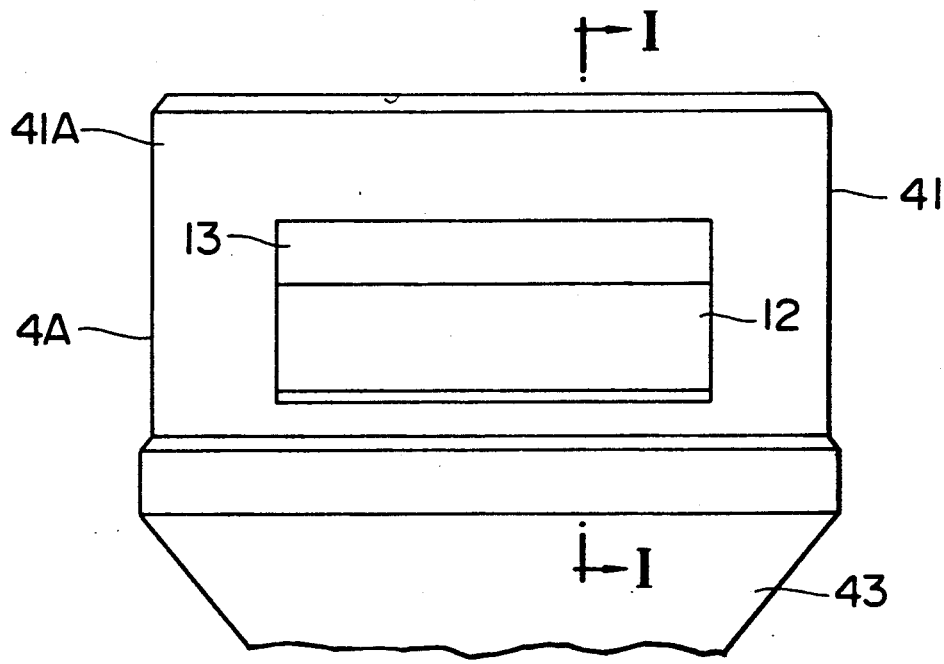
FIG. 2 is a side view of the lower tie plate in FIG. 2.

In commonly assigned U.S. Pat. Application Ser. No. 464,151 and European Patent Application No. 9-300272.3, to which the present invention is related, a fuel assembly 1 is proposed having the lower structure shown in FIG. 1. FIG. 1 illustrates a part of a lower tie plate 4A of the fuel assembly 1 facing a channel box 8. The fuel assembly 1 is applied to a boiling water reactor. The lower tie plate 4A is square in shape as viewed from above, and has a recess 12 on each of outer side faces 41A. The recess 12 is rectangular in shape and opened outwardly. The recess 12 also has an inclined surface 13 formed in its upper portion and inclined at an angle $\theta$. The upper end of the inclined surface 13 is spaced from the upper surface of the lower tie plate 4A by a distance. A portion of the outer side face 41A covering the region l is a flat surface perpendicular to the upper surface of the lower tie plate 4A except for a chamfered (or beveled) corner at the upper end. A recessed bottom surface 12A of the recess 12 is joined to the inclined surface 13, and forms a flat surface positioned at a depth h from the portion of the outer side face 41A in the region l. The channel box 8 surrounds an upper portion of the lower tie plate 4A and covers a part of the recess 12 as shown in FIG. 1.

A cooling water passage 17 comprising gaps 14–16 is, as shown in FIG. 1, defined by the outer side face 41A including the recess 12 in the lower tie plate 4A and the inner surface of the channel box 8. The cooling water passage 17 has a flow sectional area which is small at the gap 14, gradually increased from the gap 15 to the gap 16, and then becomes maximum at the gap 16. A cooling water passage 11 above the gap 14 has a large flow sectional area. It can be therefore said that the outer side face 41A, the inclined surface 13 and the bottom surface 12A, along with the inner surface of the channel box 8 opposite to those surfaces jointly constitute venturi means. Thus, the venturi means is provided in the cooling water passage 17. During operation of a reactor, a part of cooling water flowing through the lower tie plate 4A into the cooling water passage 11 above the lower tie plate 4A is let to flow out from the channel box 8 via the cooling water passage 17. In the cooling water passage 17, therefore, the cooling water flows at a high speed at the gap 14 with the small flow sectional area, and the static pressure is lowered as compared with that in the cooling water passage 11. Particularly, the static pressure is minimized at the lower end of the gap 14 (i.e., at the start point of the inclined surface 13). As a result, the pressure $P_1$ inside the channel box 8 becomes smaller than the pressure $P_2$ outside the channel box 8 so that the pressure difference $\Delta P_A = (P_1 - P_2)$ gives a negative pressure. In other words, the pressure pushing the channel box 8 inwardly becomes larger than the pressure pushing the channel box 8 outwardly (i.e., the force tending to spread the channel box 8). The pressure is gradually restored in the passage at the gap 15 and, at the lower end of the gap 16 (i.e., at the lower end of the channel box 8), the pressure difference ΔP between the inside and outside of the channel box 8 is decreased to zero.

With the pressure difference ΔP giving a negative pressure as mentioned above, the channel box 8 is attracted toward the outer side face 41A of the lower tie plate 4A. Therefore, an outward deformation of the channel box 8 at its lower end portion (i.e., a deformation tending to increase the leak flow of cooling water escaped to the exterior of the channel box 8 through the cooling water passage 17) is suppressed for thereby reducing the outward deformation degree to a large extent. It is thus possible to reduce the leak flow of cooling water during the entire operating cycle of the reactor.

The above negative pressure difference ΔP is resulted by utilizing the venturi effect expressed by the following equation (1);

$$Ps = Po - \rho v^2 / 2g \quad (1)$$

where Po is the total pressure of cooling water flowing through the cooling water passage 17, Ps is the static pressure of the cooling water, and $\rho v^2/2$ g is the dynamic pressure of the cooling water.

The effect of the venturi means will be explained in greater detail with reference to FIGS. 3 and 4.

Figure 3:
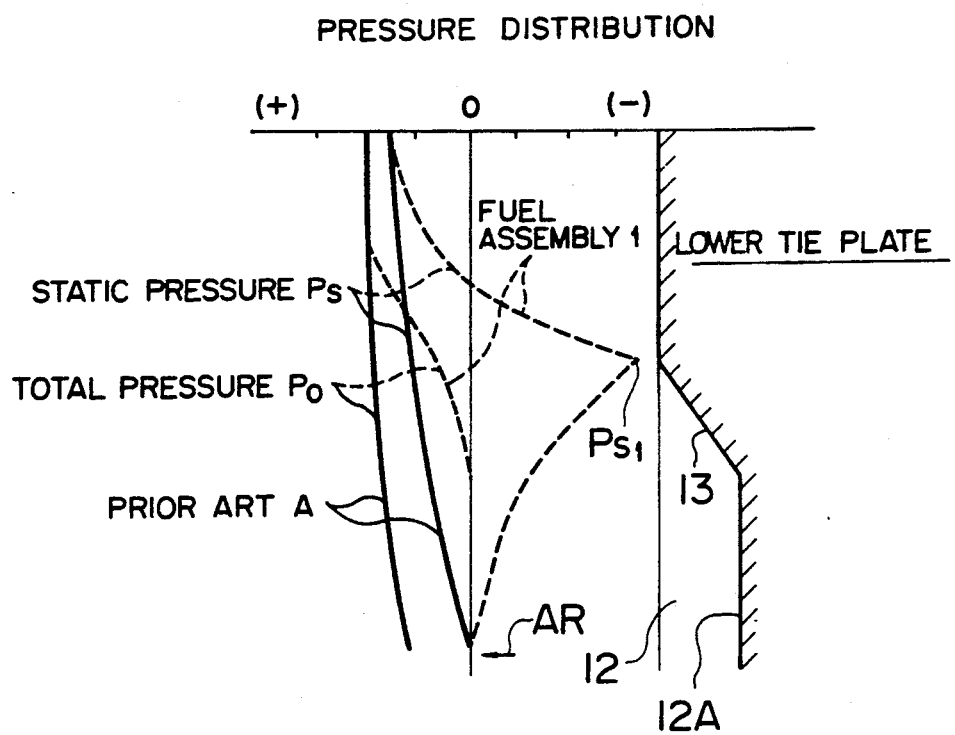
FIG. 3 is a schematic view of a pressure distribution within a cooling water passage in the direction of height.
Figure 4:
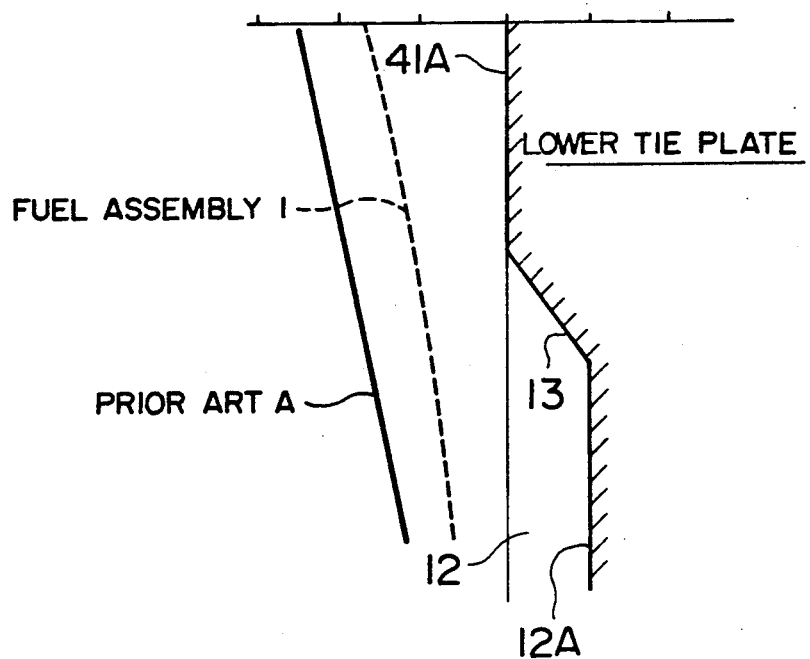
FIG. 4 is a schematic view of a distribution of elastic deformation of the channel box, starting from the upper end of the lower tie plate, in the fuel assembly of FIG. 1.

FIG. 3 shows distribution of the total pressure Po and the static pressure Ps within the cooling water passage 17 in the zone below the upper end of the lower tie plate 4A, and FIG. 4 shows an elastic deformation of the channel box 8 in the zone below the upper end of the lower tie plate 4A. In these drawings, broken lines represent characteristics of the fuel assembly 1 shown in FIG. 8, and solid lines represent characteristics of a conventional fuel assembly A (which is a conventional example of the fuel assembly 1 and hereinafter referred to as a prior art A) provided with a lower tie plate of which outer side face 41A overlapping with the channel box 8 is straight in shape and has no recess 12. In addition, the lower tie plate of the fuel assembly of the prior art A has neither the recess 12 nor cooling water supply openings (or holes) 18, unlike a lower tie plate 4 of a fuel assembly 1A later described, but has the same flow sectional area of cooling water supply holes 21-23. Note that the axis of ordinate of FIGS. 3 and 4 indicates a distance from the upper end of the lower tie plate 4A, and the arrow AR in FIG. 3 indicates a level of the lower end of the channel box 8. In FIG. 3, "0" of the pressure distribution represents the pressure $P_2$.

In the prior art A, as indicated by the solid line in FIG. 3, the force tending to deform the channel box 8 outwardly (the static pressure Ps greater than the pressure $P_2$, i.e., the positive static pressure Ps) acts on a portion of the channel box 8 below the upper end of the lower tie plate 4A. In the fuel assembly 1, as indicated by the broken line in FIG. 3, the venturi means functions to generate a force pushing the channel box 8 toward the lower tie plate 4A greater than the force pushing the channel box 8 outwardly. This is attributable to the fact that the force attracting the channel box 8 toward the lower tie plate 4A (the static pressure ePs smaller than the pressure $P_2$, i.e., the negative static pressure Ps) is produced in the cooling water passage 17. Accordingly, as shown in FIG. 4, the fuel assembly 1 is subjected to an outward deformation of the channel box 8 smaller than that in the prior art A. Note that in a functional aspect, the venturi means serves as means for generating a force attracting the channel box toward the lower tie plate.

Figure 5:
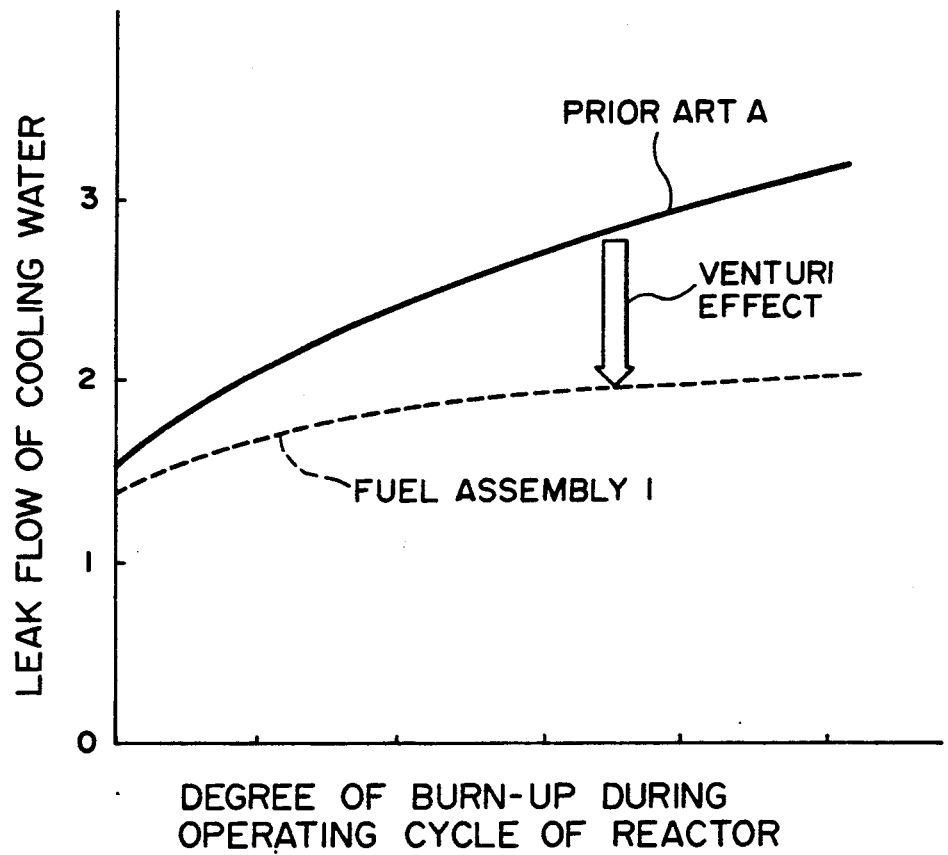
FIG. 5 is a graphical illustration of changes in the leak flow of cooling water versus the degree of burn-up during the operating cycle of a reactor with the fuel assembly of FIG. 1.

The effect of the venturi means, that is, a decrease in the leak flow of cooling water in the fuel assembly 1 will be explained below with reference to FIG. 5. FIG. 5 shows that effect with respect to the degree of burn-up (or combustion degree) during the operating cycle of a reactor. In the prior art A, because of a creep deformation of the channel box due to the static pressure of cooling water exerted on the inner surface, the leak flow of cooling water through the gap between the lower tie plate and the channel box is increased with an increase in the degree of burn-up, as indicated by the solid line in FIG. 5. In the fuel assembly 1, the leak flow of cooling water is remarkably reduced by the action of the venturi means as compared with the prior art A, as indicated by the broken line.

A flow experiment was conducted by actually permitting cooling water to flow through the fuel assembly 1 provided with the venturi means described above. As a result of the flow experiment, it was discovered that the channel box 8 of the fuel assembly 1 produces vibrations. Such vibrations of the channel box 8 may lead to a risk of damage or breakage of the channel box due to fatigue itself and collision with other structural members, such as the lower tie plate, during periods of use.

As a result of examining the causes of producing vibrations of the channel box when the venturi means is provided in the fuel assembly, two causes of producing the vibrations were determined. The first cause is fluctuations in the venturi effect developed between the channel box and the outer side face of the lower tie plate opposite to the channel box. The second cause is drawn-in or entrainment of cooling water through the lower end of the channel box. The vibrations of the channel box can be prevented by obviating one of the causes.

The first cause of producing vibrations will now be described with reference to FIG. 6. For simplicity, the following description is made to a vibration of the channel box 8 in the direction of the arrow $AR_1$ shown in FIG. 6. The direction of the arrow $AR_1$ is perpendicular to two outer side faces of the lower tie plate 4A opposite to each other. During the operation of the reactor, the channel box 8 is deformed in such a fashion that four sides bulge outwardly at their central portions as shown in FIG. 6. Taking the aforesaid outward deformation into consideration, the channel box 8 is originally concaved inwardly at the central portions of the four sides. However, the channel box used in the prior art A is deformed outwardly to such a extent greater than shown in FIG. 6. Let it now be assumed that the gap between the outer side face $41A_1$ and the channel box 8 has a width $\epsilon_1$, and the gap between the outer side face $41A_2$ and the channel box 8 has a width $\epsilon_2$. The gap width $\epsilon_1$ and the gap width $\epsilon_2$ may be different from each other due to an attachment condition of the channel box 8 to an upper tie plate as a part of the fuel assembly, machining accuracy of the channel box 8 (about 4 m long), and other factors. Because the lower end of the channel box 8 is a free end, the probability that both the gap widths $\epsilon_1$ and $\epsilon_2$ become equal to each other is small. Here, consider the case of $\epsilon_1 < \epsilon_2$. The pressure loss coefficient of a cooling water passage 17B with the large gap width is greater than that of a cooling water passage 17A with the small gap width. This implies that the flow speed of cooling water in the cooling water passage 17B is faster than that in the cooling water passage 17A with the smaller gap width $\epsilon_1$. The magnitude of negative pressure (i.e., the difference between the static pressure $Ps_1$ and the pressure $P_2$) corresponding to the minimum static pressure $Ps_1$ (FIG. 3), which is generated by the venturi means provided in the cooling water passage 17B, becomes greater than that corresponding to the minimum static pressure $Ps_1$ which is generated by the venturi means provided in the cooling water passage 17A. Accordingly, a difference occurs between the forces attracting the channel box 8 toward the outer side faces $41A_1$ and $41A_2$, causing the lower end of the channel box 8 to entirely move in the direction of the arrow $AR_2$. This results in the relationship of $\epsilon_1 < \epsilon_2$. In case of $\epsilon_1 > \epsilon_2$, the similar phenomenon is developed in the cooling water passages 17A and 17B in a reverse manner to the above one in the case of $\epsilon_1 < \epsilon_2$, causing the lower end of the channel box 8 to entirely move in the direction of the arrow $AR_3$. These phenomena are alternately repeated so that the lower end of the channel box 8 is entirely vibrated in the direction of the arrow $AR_1$. Such a vibration may also be produced between the outer side faces $41A_3$ and $41A_4$, i.e., in the direction of the arrow $AR_4$. When the vibrations in the directions of the arrows $AR_1$ and $AR_4$ are produced simultaneously, the entire lower end of the channel box 8 is moved in a more complicated manner.

The second cause of producing vibrations will now be explained with reference to FIGS. 7A–7C. Even for one cooling water passage 17B, there is a difference in width of the gap formed between the outer side face $41A_2$ and the channel box 8. Taking along a cross-section, the gap width is larger at a central portion of the recess 12 and smaller at both side portions of the recess 12 (FIG. 7A). The flow speed of cooling water flowing into the recess 12 from above is faster in the central portion of the recess 12 with the larger gap width than in the side portions thereof. The venturi effect is increased at the central portion of the recess 12 where the cooling water flows at a faster speed. This produces cooling water flows FL (FIG. 7B) within the recess 12 which are directed from both the side portions of the recess 12 where the larger magnitude of negative pressure develops, to the central portion of the recess 12 where the smaller magnitude of negative pressure develops. In both the side portions of the recess 12, therefore, the static pressure Ps becomes lower than the pressure $P_2$, i.e., a negative pressure. As a result, the cooling water outside the channel box 8 is drawn into the cooling water passage 17B from below the lower end of the channel box 8 at both the side portions of the recess 12. $FL_1$ in FIGS. 7B and 7C represents such a drawn-in flow. Upon an influence of the drawn-in flow $FL_1$, a vortex U is produced at the lower end portion of the cooling water passage 17B, which makes a stream of the cooling water unstable at the lower end portion of the cooling water passage 17B. Consequently, the side wall of the cooling water channel 17B facing the channel box 8 vibrates at a high frequency. Such a phenomenon also occurs in the other cooling water passages 17A, 17C and 17D.

An embodiment of the present invention capable of solving the causes of producing vibrations of the channel box will be described below.

A fuel assembly as one preferred embodiment of the present invention will be explained by referring to the drawings. This fuel assembly is employed in boiling water reactors.

Figure 8:
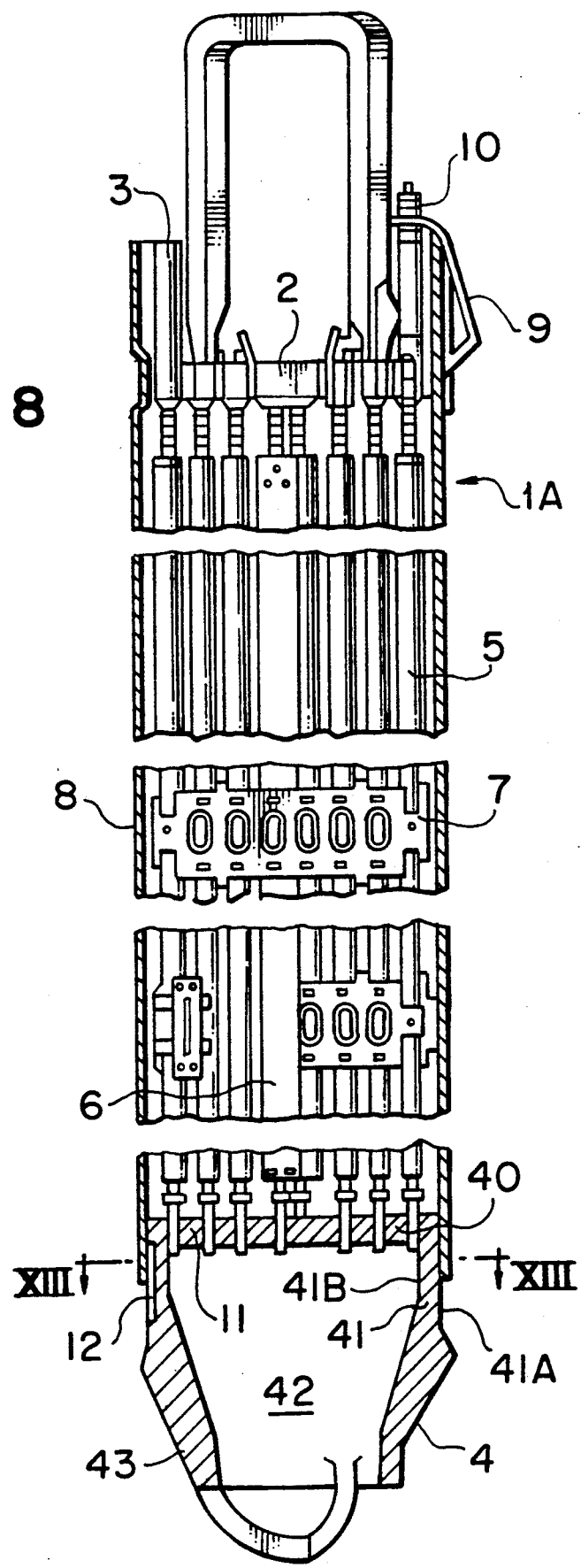
FIG. 8 is a vertical sectional view of a fuel assembly according to one preferred embodiment of the present invention.
Figure 9:
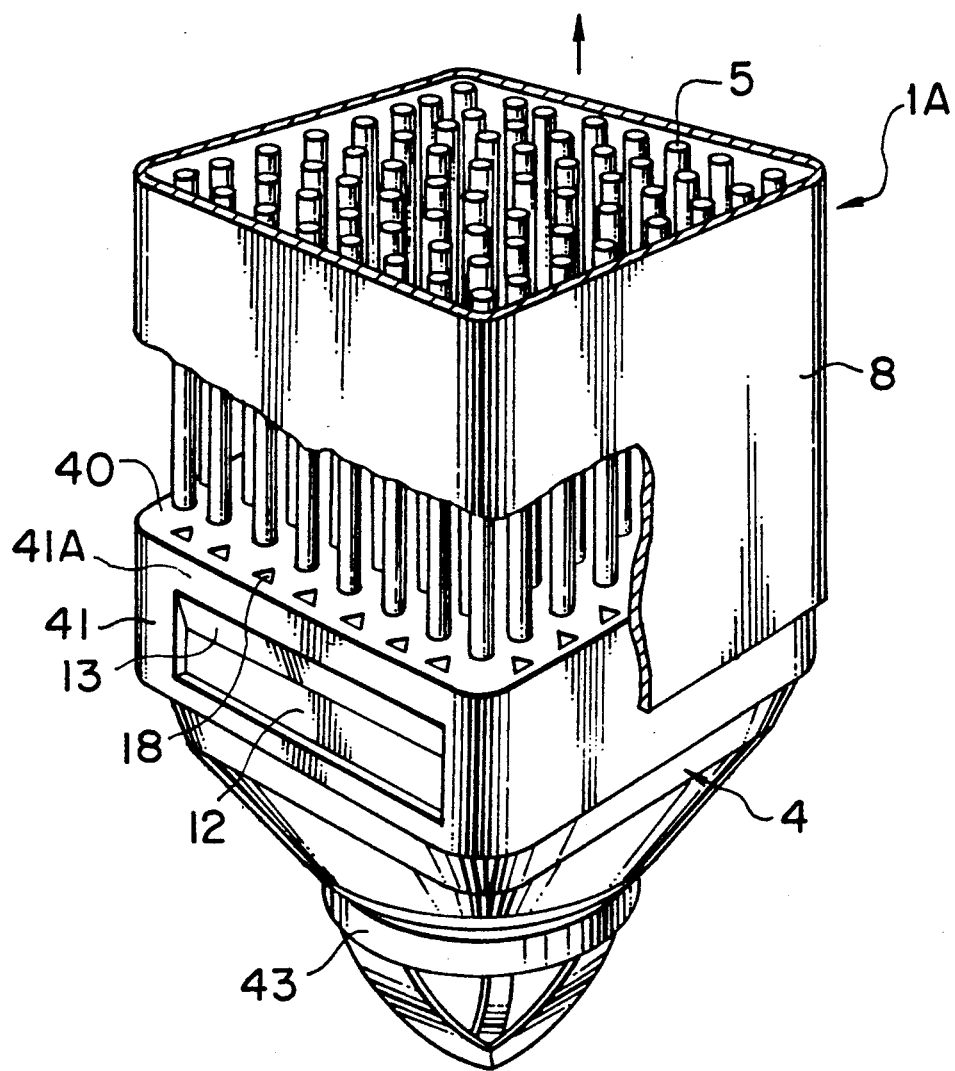
FIG. 9 is an enlarged perspective view of a part of the fuel assembly including a lower tie plate in FIG. 8.

In FIGS. 8 and 9, a fuel assembly 1A of this embodiment comprises an upper tie plate 2, a lower tie plate 4, a plurality of fuel rods 5, water rod 6, and a plurality of fuel spacers 7. Respective opposite ends of the fuel rods 5 and the large-diameter water rod 6 are fixedly held by the upper tie plate 2 and the lower tie plate 4. The upper and lower tie plates 2, 4 are coupled to each other by a tie rod (not shown). The fuel rods 5 are supported by each fuel spacer 7 in a horizontal plate. Therefore, a cooling water passage 11 of a predetermined width is defined between adjacent pairs of the fuel rods 5.

In the fuel assembly 1A, as shown in FIG. 1 of JP-A-62-217186, the fuel rods 5 are arranged in a matrix of nine rows and nine columns with two large-diameter water rods located at the center. In this embodiment, however, the two large-diameter water rods are located with a gap therebetween as shown in FIG. 7 of JP-A-62-217186.

The channel box 8 is a tubular member being square in cross-section, and is attached to corner posts 3 of the upper tie plate 2 by screws 10 provided on a channel fastener 9. The lower end of the channel box 8 is a free end. The channel box 8 surrounds a bundle of the fuel rods 5 bound together by the fuel spacers 7.

The lower tie plate 4 includes a grid 40 as a fuel support portion, a tubular side wall 41 being square in cross-section and joined to the grid 40, with the side wall 41 having four outer side faces 41A as four side faces of the lower tie plate 4 and inner side faces 41B jointly defining an inner space 42, and a nozzle portion 43 joined to the tubular side wall 41 and introducing a coolant (cooling water) into the inner space 42.

Figure 10:
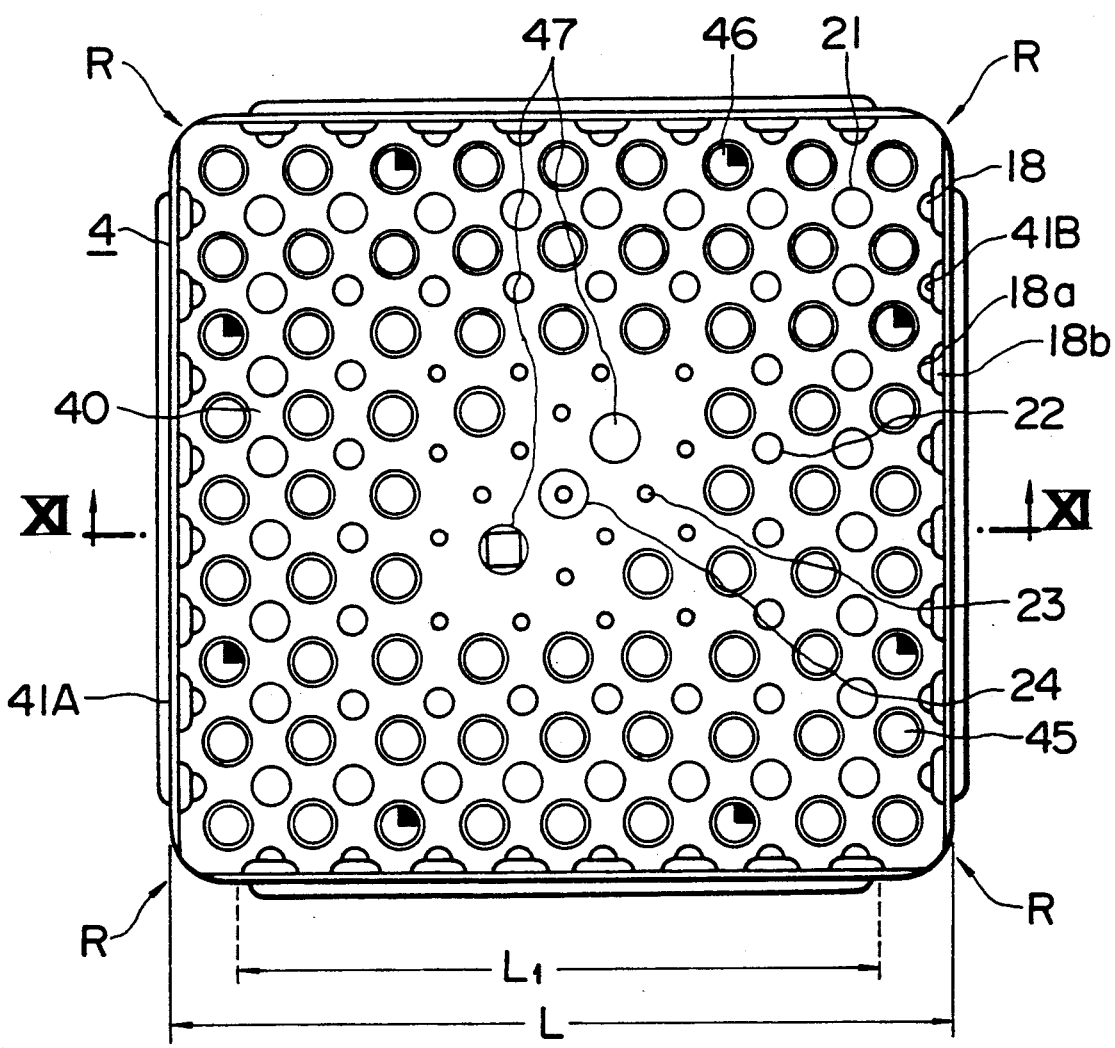
FIG. 10 is a top plan view of the lower tie plate in FIG. 8.
Figure 11:
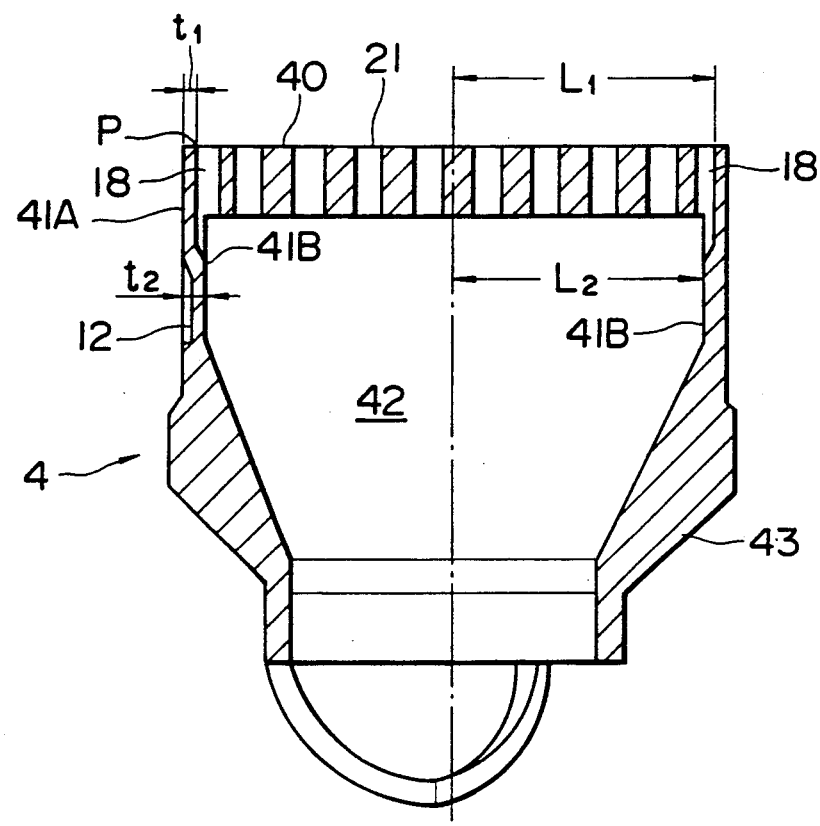
FIG. 11 is a sectional view taken along the line XI—XI in FIG. 10.

As shown in FIGS. 10 and 11, the grid 40 has fuel rod attachment holes (or openings) 45 into which the lower ends of the respective fuel rods 5 are inserted, tie rod attachment holes (or openings) 46, and water rod attachment holes 47 into which the lower ends of the respective water rods 6 are inserted. The grid 40 further has cooling water supply holes 18, 21, 22, 23, 24 with different flow sectional areas from each other, which are disposed in mixed relation to those attachment holes 45, 46, 47 for directing the cooling water introduced into the inner space 42 upwardly of the grid 40, i.e., into the cooling water passages 11. Of these cooling water supply holes, the outermost cooling water supply holes 18 constitute flow passage means for reducing a force of driving the coolant water to leak through the cooling water passage 17, and generating a coolant flow adapted to suppress a leak of the cooling water through the passage 17, when the fuel assembly 1 is loaded into a reactor core. Hereinafter, the coolant flow ejecting through the cooling water supply holes 18 is referred to as a jet flow.

Figure 12:
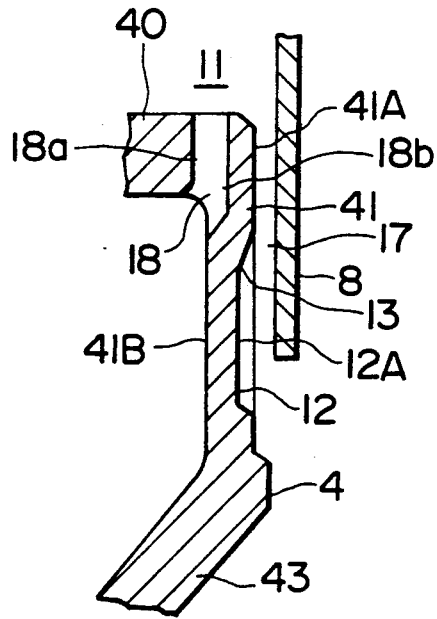
FIG. 12 is an enlarged vertical sectional view of a part of the lower tie plate including a recess.

As shown in FIGS. 10 and 12, each of the cooling water supply holes 18 have an inner portion 18a penetrating through a part of the grid 40 located inwardly of the inner side face 41B of the tubular side wall 41, and an outer portion 18b located outwardly of the inner side face 41B and bores into the tubular side wall 41 to open in the inner side face 41B. Thus, an outlet of the cooling water supply hole 18 is positioned closer to the outer side face 41A of the lower tie plate 4 than an outlet of the outermost cooling water supply hole in the prior art A.

Stated otherwise, the cooling water supply holes 18 are each configured as follows. In FIG. 11, the dimension $t_1$ between a point P in the inner peripheral surface of the outlet of the cooling water supply hole 18 which locates on the same side as the outer side face 41A of the lower tie plate 4 (i.e., a part of that inner peripheral surface nearest to the outer side face 41A) and the outer side face 41A is smaller than the thickness $t_2$ of the side wall of the lower tie plate 4 (i.e., the thickness of the tubular side wall 41). This is because the point P is positioned nearer to the outer side face 41B than to the inner side face 41A of the tubular side wall 41. Looking from another aspect, the dimension $L_1$ between the point P at the outlet of the cooling water supply hole 18 and the center axis of the lower tie plate 4 is greater than the dimension $L_2$ between the inner side face 41B of the lower tie plate 4 and the center axis of the lower tie plate 4. Also, a part of the cooling water supply hole 18 is positioned (nearer to the outer side face 41A) outwardly of those of the fuel rod insertion holes (i.e., the fuel rod attachment holes 45 and the tie rod attachment holes 46) into which the lower ends of outermost ones of the fuel rods 5 are to be inserted. As an alternative, the cooling water supply hole 18 may be entirely positioned outwardly of those fuel rod insertion holes.

In order to increase the leak suppressing function of the sealing effect of the jet flow for the cooling water, it is important that the total flow sectional are of the cooling water supply holes 21 locating in the outer peripheral portion is set to maximum, whereas, the flow sectional areas of the inner supply holes 22, 23, 24 are narrowed down or set smaller.

In view of the above, allocation of the flow sectional areas of the cooling water supply holes 18, 21–24 will now be explained. Assuming that the flow sectional area of one cooling water supply hole 18 is a, the flow sectional area of one cooling water supply hole 21 locating inside the supply hole 18 is b, the flow sectional area of one cooling water supply hole 22 located inside the supply hole 21 is c, and the flow sectional area of one cooling water supply hole 24 at the center is d, the total flow sectional areas of the cooling water supply holes in the respective regions are expressed by:

$$A = \sum_{i=1}^{n_a} a_i \quad B = \sum_{i=1}^{n_b} b_i$$
$$C = \sum_{i=1}^{n_c} c_i \quad D = \sum_{i=1}^{n_d} d_i$$
$$E = e$$

The boundaries between the respective regions of cooling water supply holes are given by lines connecting those plural fuel rod insertion holes 45 located between adjacent two regions of the cooling water supply holes 18 and 21–23 and are parallel to an array of the cooling water supply holes, except for the cooling water supply holes 24. Percentages of the total flow sectional areas of the cooling water supply holes in the respective regions fall in ranges shown in the following Table 1.

TABLE 1

| Supply Hole Region | A | B | C | D | E |
|---|---|---|---|---|---|
| Percentage of Flow sectional Area of Water Supply Holes | 25–35 (%) | 40–50 | 15–25 | 2–10 | 0–5 |

More specifically, the total flow sectional area of the cooling water supply holes 18 is set as large as possible in the range of 25–35%, and the total flow sectional area of the cooling water supply holes 21 set to maximum in the range of 40–50%. Then, the total flow sectional areas of the cooling water supply holes nearer to the center are gradually reduced; the total flow sectional area of the cooling water supply holes 22 is set in the range of 15–25%, the total flow sectional area of the cooling water supply holes 23 is set in the range of 2–10%, and the total flow sectional area of the cooling water supply holes 24 is set in the range of 0–5. The cooling water supply holes 24 are also used as holes for attaching the lower tie plate 4 to a machine tool when it is machined.

By way of one practical example, the following Table 2 shows numerical values in the case of the fuel assembly 1A where the fuel rods 5 are arranged in a matrix of nine rows and nine columns. In this practical example, the percentages of the total flow sectional areas in the respective regions meet the ranges of the Table 1. The numerical values relating to the diameter, the number and other parameters of the cooling water supply holes are listed only by way of example, and the present invention is not limited to those numerical values.

TABLE 2

| | Item | | | |
|---|---|---|---|---|
| Region | Dia. of Water Supply Hole (mm) | Number of Water Supply Holes | Total Flow Sectional Area in Each Region (mm$^2$) | Percentage of Total Flow Sectional Area (%) |
| A | Non-circle | 32 | 960 | 29.8 |
| B | 8.0 | 28 | 1407 | 43.7 |
| C | 6.5 | 20 | 664 | 20.6 |
| D | 3.3 | 18 | 152 | 4.7 |
| E | 7.0 | 1 | 39 | 1.2 |

The above percentages of the respective total flow sectional areas represent properties of the total flow sectional areas of of the cooling water supply holes in the respective regions with respect to the total su of flow sectional areas (=A+B+C+D+E) of all the cooling water supply holes provided in the lower tie plate 4, i.e., the ratio of total sectional areas of the cooling water supply holes in the respective regions.

Figure 13:
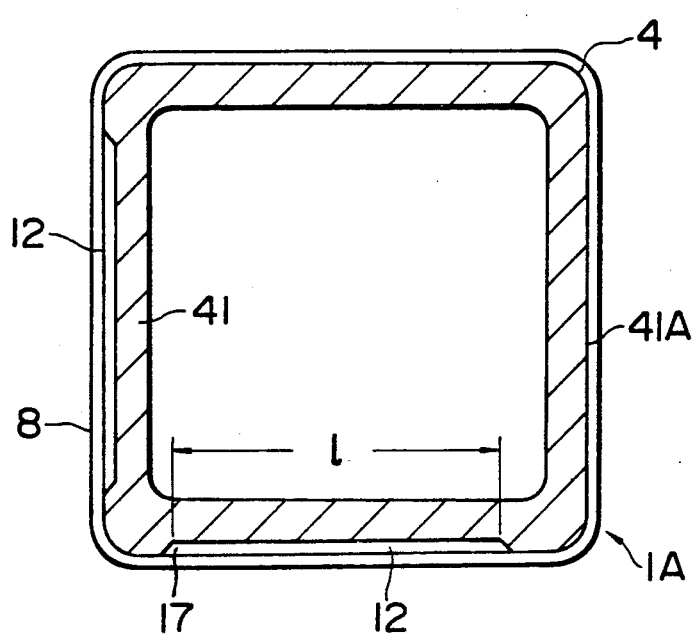
FIG. 13 is a cross-sectional view (taken along the line I—I in FIG. 8) of the lower tie plate of the fuel assembly according to the preferred embodiment of the present invention.

In the fuel assembly 1A of this embodiment, as shown in FIG. 13, a recess 12 is provided in each of two outer side faces 41A of the lower tie plate 4 with one corner therebetween. The remaining two outer side faces 41A include no recess 12. Thus, the recess 12 is provided in one of each pair of outer side faces 41A of the lower tie plate 4 opposite to each other. As with the foregoing fuel assembly 1, the cooling water passage 17 having venturi means is also defined in the fuel assembly 1A between the lower tie plate 4 and the channel box 8 by providing the recess 12. The fuel assembly 1A includes no finger spring in the cooling water passage 17 as with the fuel assembly 1.

The embodiment of FIG. 13 employs the flow passage means provided in the grid 40 of the lower tie plate 4 for generating jet flows, and the venturi means formed between the channel box 8 and the lower tie plate 4 in a combined manner. It is therefore possible to effectively supplies a leak of the cooling water, while suppressing a deformation of the channel box 8, based on a synergistic effect of the function of suppressing a leak of the cooling water by the jet flows and the function of suppressing a deformation of the channel box by the venturi means. In addition, this embodiment further has a function of suppressing vibrations of the channel box.

During operation of a boiling water reactor, cooling water is supplied to the fuel assembly 1A previously loaded in a reactor core. The cooling water is introduced into the channel box 8 through the cooling water supply holes 18 and 21-24 formed in the grid 40 of the lower tie plate 4. Most of the cooling water introduced into the channel box 8 rises through the cooling water passages 11 and then flows out upwardly from the upper tie plate 2. A part of the cooling water is leaked to the exterior of the fuel assembly 1A via the cooling water passage 17. However, the amount of cooling water leaked is firstly suppressed under the action of the jet flows ejected by the flow passage means, comprising the outermost cooling water supply holes 18, from the outer peripheral edge of the lower tie plate 4 toward the inner surface of the channel box 8.

Figure 14:
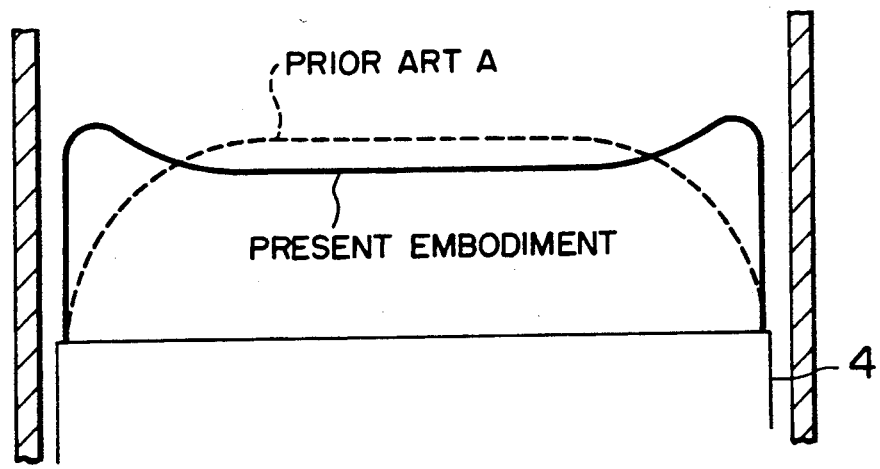
FIG. 14 is a schematic view of a distribution of the flow rate of cooling water on the upper surface of the lower tie plate.

The principle of the jet flow effect relies on the fact that the static pressure at the inlet of the cooling water passage 17 (i e., the upper end of the gap 14) is lowered under the action of the jet flows ejected from the outer peripheral edge of the lower tie plate 4 to thereby reduce a force of driving the cooling water to leak. As compared with the prior art A, the flow rate of cooling water is increased in the vicinity of the channel box 8 in this embodiment (FIG. 14). FIG. 14 shows distribution of the flow rate of cooling water on the upper surface of the lower tie plate 4. With this embodiment exhibiting such a distribution of the flow rate of cooling water, the jet flows act to create a low pressure region at locations below the jet flows ejected from the cooling water supply holes 18 and near the inner surface of the channel box 8, i.e., in the vicinity of the inlet of the cooling water passage 17. Accordingly, the cooling water within the channel box 8 can be suppressed from leaking to the exterior through the cooling water passage 17.

The jet flow effect becomes more effective by approaching the outlet of each cooling water supply hole 18 in the grid 40 toward the outer side face 41A of the lower tie plate 4 (i.e., by arranging the point P nearer to the outer side face 41A). Also, the function of suppressing a leak of the cooling water or the sealing effect by the jet flows can be enhanced by setting the flow sectional area of the water supply holes in the outer peripheral portion of the lower tie plate to be larger and setting the flow sectional area of the water supply holes at the center of the lower tie plate to be smaller. Furthermore, by properly selecting the flow sectional areas of the water supply holes in the respective regions, there can be obtained an additional effect of making distribution of flow speeds within the fuel assembly 1A after outgoing from the lower tie plate 4 more even than with the prior art A.

Particularly, in this embodiment, the cooling water supply holes 18 are each configured such that one part of the hole 18 (i.e., the outer portion 18b) located outwardly of the outermost ones of a plurality of the fuel rod insertion holes has a horizontal width larger than that of the remaining part of the hole 18 (i.e., the inner portion 18a) located in the region between adjacent flows of the outermost fuel rod insertion holes. Therefore, the jet flows can be supplied almost evenly throughout the inner surface of the channel box 8 except for its corners. This is effective in reducing the leak flow of cooling water.

In principle, the venturi means of the fuel assembly 1A develops the function represented by the broken line in FIG. 3 as with the venturi means of the fuel assembly 1. Specifically, the side walls of the channel box 8 respectively facing the two outer side faces 41A provided with the recesses 12 are subjected to forces for attracting those side walls toward the lower tie plate 4. However, such forces are not exerted on the side walls of the channel box 8 respectively facing the other two outer side faces 41A provided with no recess 12. Only two of the four side walls of channel box 8 are thus less susceptible to the outward deformation. In this embodiment, therefore, the effect of suppressing the leak flow of cooling water by the venturi mean is reduced as compared with the effect illustrated in FIG. 5. However, when adding the effect of suppressing the leak flow of cooling water by the jet flows, the resultant suppressing effect in this embodiment becomes larger than that illustrated in FIG. 5. On the other hand, the effect of suppressing the leak flow of cooling water in this embodiment is smaller than that in a later-described embodiment shown in FIG. 22 which also employs the jet flows and the venturi means in a combined manner.

Figure 15:
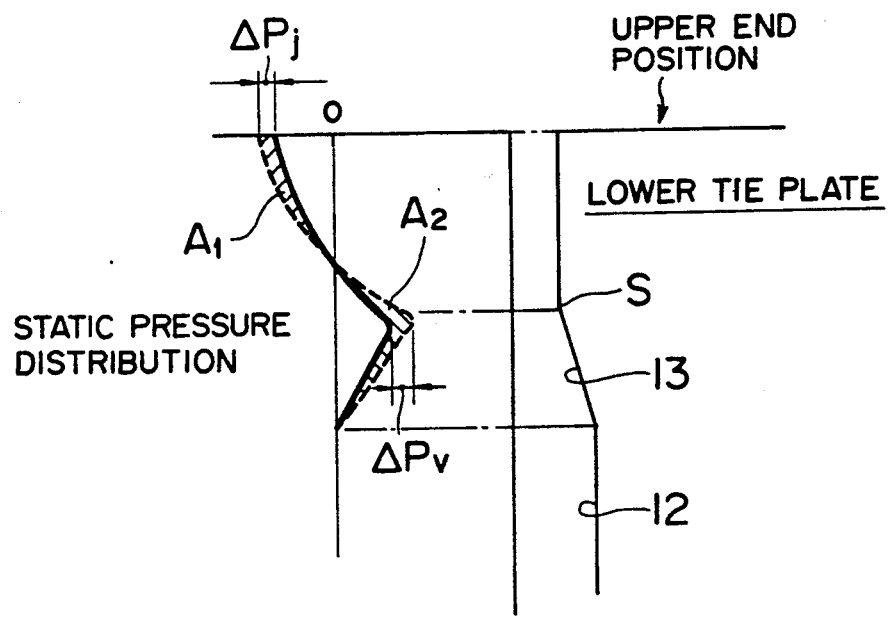
FIG. 15 is a schematic view of a distribution of the static pressure within a cooling water passage 17 in FIG. 12.

Meanwhile, due to combined use of the jet flows and the venturi means, the pressure at the inlet of the cooling water passage 17 provided with the venturi means is reduced with the jet flow effect in this embodiment, so that the flow of cooling water in the cooling water passage 17 exhibits different distribution of the static pressure from that in the case of using the venturi means alone. FIG. 15 shows the distribution of the static pressure in a like manner to FIG. 3, in which the solid line represents the case of utilizing the jet flow effect as well, and the broken line represents the case of employing the venturi means alone.

In the case of employing the jet flows as well, the pressure at the upper end of the lower tie plate, i.e., at the inlet of the cooling water passage 17, is lowered by $\Delta P_j$. Correspondingly, the flow speed of the cooling water leaked is lowered and the static pressure at the starting point S of the inclined surface 13 is increased. However, the pressure tending to deform the channel box 8 is determined by the total of the static pressure distributed ranging from the upper end of the lower tie plate to the lower end of the channel box, and is given by the difference in distribution areas of the static pressure with the pressure 0 (i.e., the pressure $P_2$) in FIG. 15 set as a reference. With regard to the difference in distribution areas of the static pressure, the effect $A_1$ of reducing the distribution area of the positive static pressure with the pressure drop $\Delta P_j$ is nearly equal to the effect $A_2$ of reducing the distribution area of the negative static pressure with the drop in the flow speed. Consequently, the combined use of the jet flows and the venturi means produces substantially the same effect as that in the case of employing the venturi means alone. In other words, the drop $\Delta P_j$ in the static pressure produced at the upper end of the lower tie plate 4 by the jet flow effect becomes nearly equal to a rise $\Delta P_v$ in the static pressure caused by the drop in the flow speed due to the above $\Delta P_j$. As a result, in the case of employing the jet flows as well, the effect of the venturi means will now be affected by the jet flows.

In this embodiment, as described above, the leak flow of cooling water can be kept almost constant during the operating cycle, thereby making it possible to stabilize a thermal output of the fuel assembly 1A.

Also, the aforesaid effect of this embodiment can be achieved with such a simple structure that the cooling water supply holes 18 are provided in the outer peripheral edge of the grid 40 of the lower tie plate 4 to provide the jet flow effect, and the flow sectional area is gradually changed, like the cooling water passage 17 formed between the channel box 8 and the lower tie plate 4, to provide the venturi effect.

Finally, the following is description about the function of suppressing vibrations of the channel box 8. The lower tie plate 4 has two pairs of outer side faces 41A opposite to each other, one of the paired outer side faces 41A includes the recess 12 and the other one has no recess. The force attracting the side wall of the channel box 8 toward the lower tie plate 4 is produced by the venturi effect for the outer side face 41A including the recess 12. Accordingly, the attraction force is always greater in one of the paired outer side faces 41A opposite to each other than in the other one. The first vibration generating cause can be thereby solved to remarkably suppress vibrations of the channel box 8 at its lower end portion. At the same time, vibrations of the channel box 8 due to the second vibration generating cause can also be suppressed to a large extent. Moreover, in this embodiment, the recess 12 is configured at its opposite side edges to allow relief of a cutting blade, as shown in FIG. 13, when the recess 12 is cut by a machine tool. In this case, the width l of the recess 12 becomes equal to the width of a flat portion of the recess 12.

For the purpose of developing the function of the venturi means, it is desirable to take into account conditions below. These conditions are also equally applied to other embodiments described later.

Figure 16:
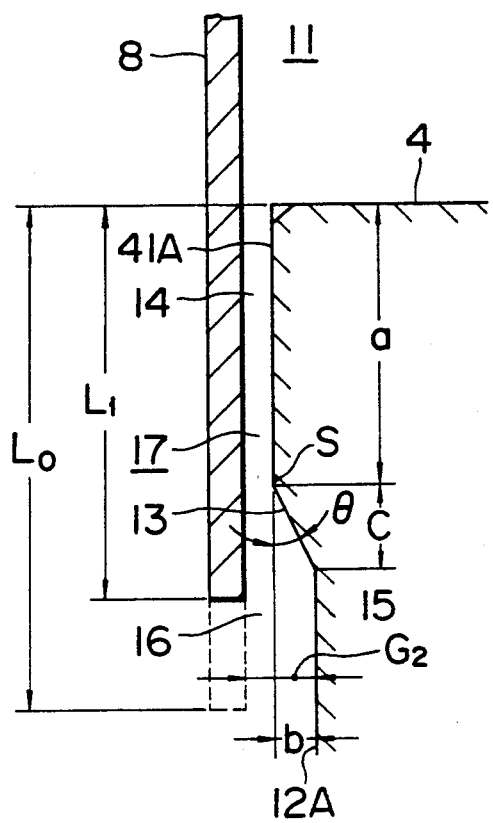
FIG. 16 is an enlarged vertical sectional view of the lower end of the channel box and the neighboring area in the fuel assembly which has been loaded into a reactor core.

Turning to FIG. 16, the distance $L_0$ from the upper end of the lower tie plate 4 to the start point S of the inclined surface 13 and the distance $L_0$ from the upper end of the lower tie plate 4 to the lower end of the channel box 8 are desirably set such that $a/L_0$ meets the following condition for the fresh fuel assembly 1A (with the degree of burn-up 0 GWd/t) prior to loading into the reactor core. Note that the distance $L_0$ is value obtained with the degree of burn-up 0 GWd/t.

$$0.3 \leq a/L_0 < \alpha \quad (2)$$

In this equation, $\alpha$ is a limit value set to avoid the lower end of the inclined surface 13 from being positioned below the lower end of the channel box 8, even when the lower end of the channel box 8 is moved upwardly to bring about such a shift as from $L_0$ to $L_1$ with the increased degree of burn-up. The limit value depends on setting conditions of the degree of burn-up for the fuel assembly 1A. If the lower end of the inclined surface 13 is positioned below the lower end of the channel box 8, then the venturi means could no longer develop the venturi effect. In this case, the leak flow of coolant water is abruptly increased.

On the other hand, if the distance a is increased, then the frictional pressure loss between the channel box 8 and the lower tie plate 4, i.e., the flow resistance between these two members 8 and 4, would be enlarged to suppress an increase in the leak flow of cooling water. But, because the start point S of the inclined surface 13 approaches the lower end of the channel box 8, the region where the pressure difference $\Delta P$ becomes negative or zero to be capable of suppressing the outward deformation of the channel box 8 would come nearer to the lower end of the channel box 8, thereby increasing a creep deformation of the channel box 8 as compared with that in the case of the smaller distance a.

Figure 17:
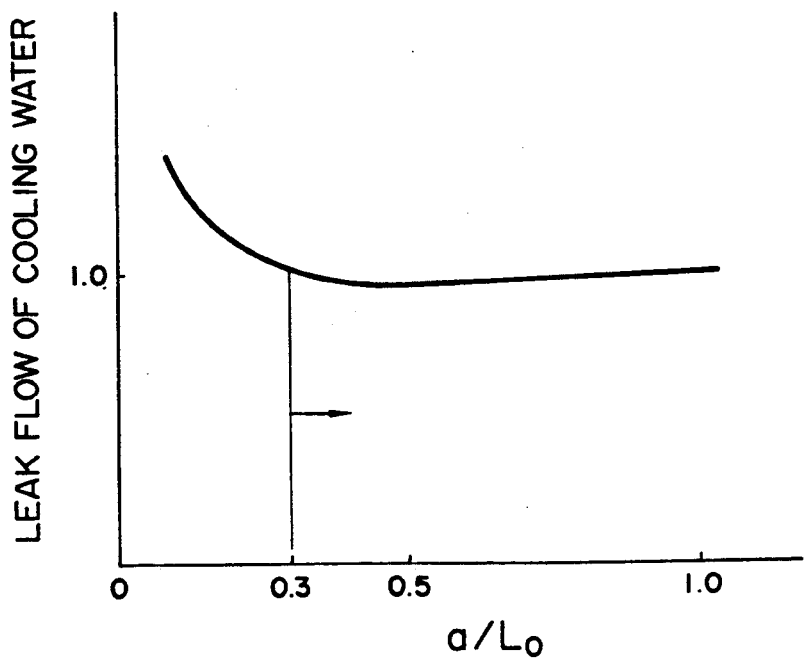
FIG. 17 is a graphical illustration of the relationship between a/Lo, which is a value relating to the relative relation in positions of the lower end of the channel box and the upper end of the lower tie plate, and the leak flow of cooling water.
Figure 18:
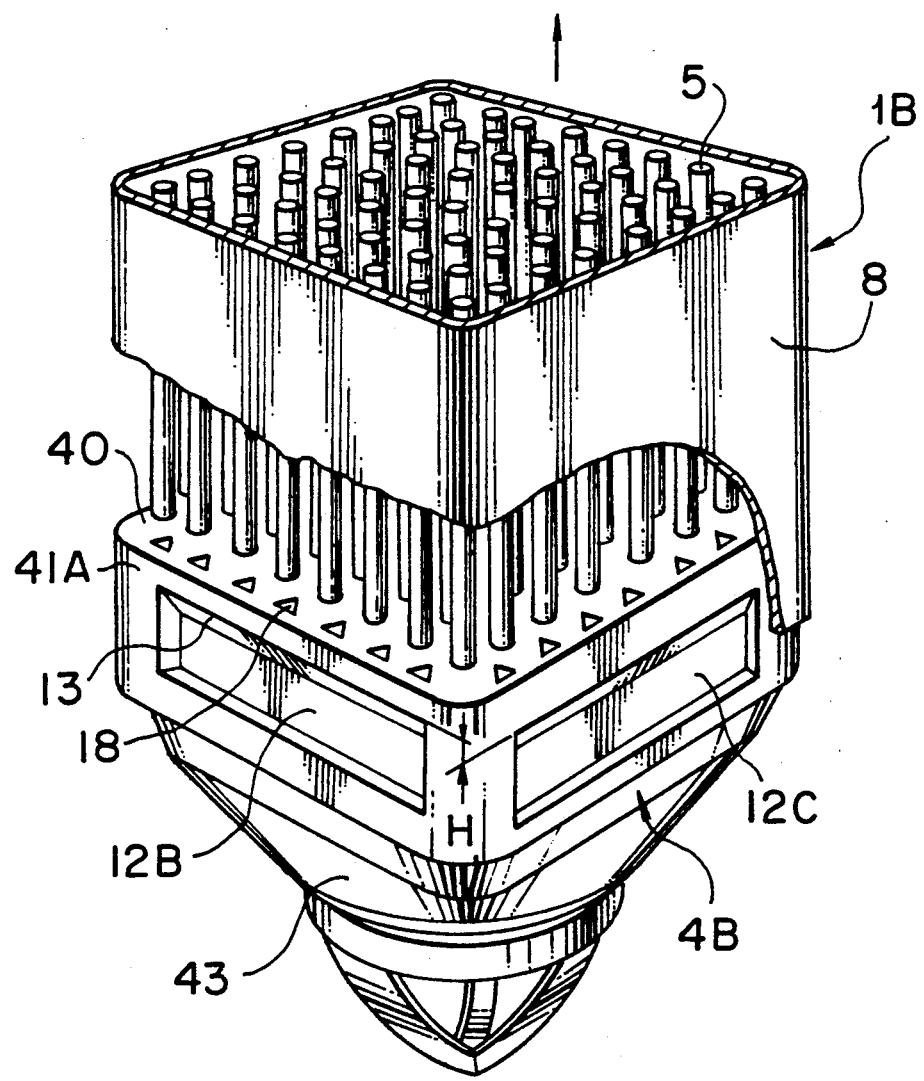
FIGS. 18, 26 and 30 are each an enlarged perspective view of a part of a fuel assembly including a lower tie plate according to another embodiment of the present invention.
Figure 19:
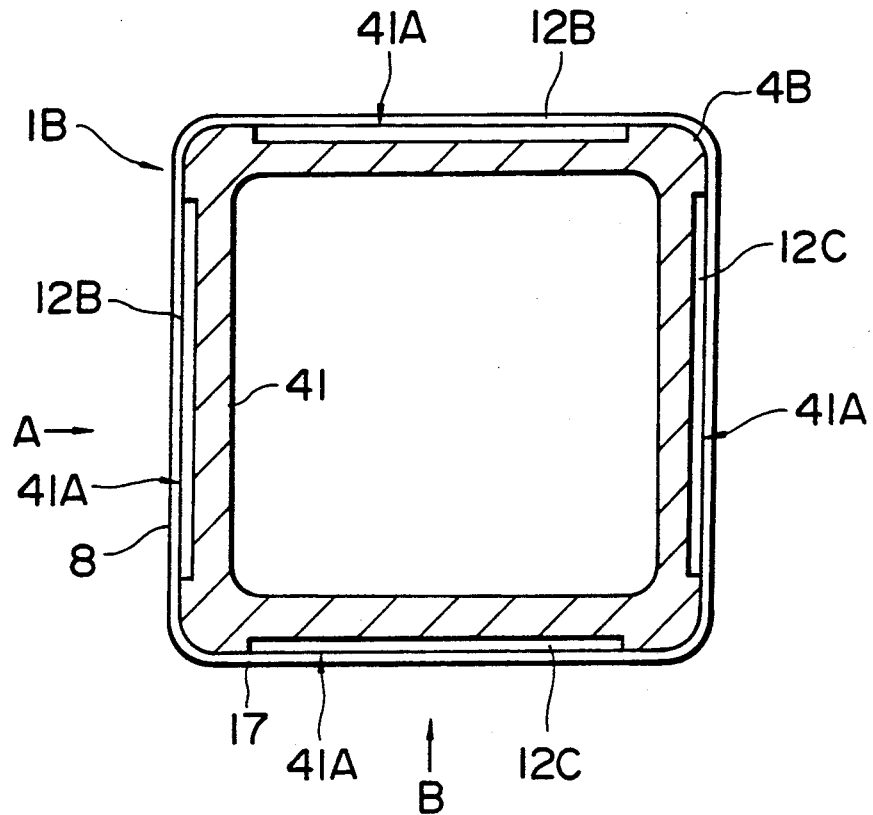
FIG. 19 is a cross-sectional view of the lower tie plate in FIG. 18.

FIG. 17 shows dependency of the leak flow of cooling water on the distance a when taking into account a creep deformation of the channel box 8. As seen from a characteristic curve of FIG. 17, the leak flow of the cooling water is remarkably reduced in the range of $a/L_0 \geq 0.3$. It is therefore desirable to meet the condition of $a/L_0 \geq 0.3$. In particular, since the leak flow of the cooling water becomes minimum at $a/L_0 \geq 0.6$, it is preferable to meet the condition of $a/L_0 \leq 0.6$.

Further, the angle $\theta$ of the inclined surface 13 of the recess 12 is preferably in the range of 5-6°. With the angle $\theta$ ranges 5-6°, the pressure loss is minimized at the gap 15 and the venturi effect is maximized.

It is desirable that the depth b of the bottom surface 12A of the recess 12A be in the range of 1-2 mm. The depth b of the recess 12 should be determined such that the pressure difference $\Delta P$, which has turned negative at the lower end of the gap 14, is restored to zero. In other words, the dynamic pressure $\rho v^2/2g$ should be almost zero at the gap 16. For this reason, the depth b must be greater than 1 mm. However, as the depth b is so increased, the side wall thickness of the lower tie plate becomes too thin, which leads to a problem of strength. In consideration of the above, the range of 1-2 mm is preferable one of the depth b.

Moreover, in order to maximize the venturi effect, it is desirable that no such projections as narrowing the width $G_2$ of the gap 16 be provided in the recess 12.

A fuel assembly 1B according to another embodiment of the present invention will be described below with reference to FIGS. 18, 19, 20A and 20B. The fuel assembly 1B is different from the fuel assembly 1A in only the lower tie plate. A lower tie plate 4B of this embodiment has the recesses 12 in all of the four outer side faces 41A. The distance l up to the recess (12B in FIGS. 18 and 19) provided in one of each pair of the outer side faces 41A opposite to each other is shorter by a distance H than the distance l up to the recess (12C in FIGS. 18 and 19) provided in the other of each pair of the outer side faces 41A. The recesses 12B and 12C are similar in shape to the recess 12 of the lower tie plate 4. The lower tie plate 4B has the same structure as the lower tie plate 4 except for the recesses 12B and 12C.

In this embodiment, because the distance l up to the recess 12B is different from the distance l up to the recess 12C, the static pressure $Ps_1$ due to the venturi effect is produced at different positions or levels in the regions of the cooling water passage 17 containing the respective recesses. Thus, the static pressure $Ps_1$ corresponding to the recess 12B is produced at a position higher than that corresponding to the recess 12C is produced. With this embodiment, therefore, the attraction forces generated by the respective venturi means act on paired two side faces of the channel box 8 opposite to each other at different points spaced in the vertical direction. Stated otherwise, the regions on the side faces of the channel box 8 which are subjected to the attraction forces differ from each other vertically between the opposite inner surfaces of the channel box 8. As a result of that the attraction forces act on the two opposite side faces of the channel box 8 at different points, as mentioned above, the first vibration generating cause can be solved to suppress vibrations of the channel box. In this embodiment, while the recesses 12B and 12C respectively provided in the two opposite outer side faces of the lower tie plate are similar in shape, vertical positions of the recesses are different from each other. In a later-described embodiment shown in FIG. 28, the recesses are also provided at different positions. Here, what is meant by the shape of the recess includes respective shapes of the recess as viewed from the front of the outer side face 41A and as taken along the (cross and vertical) sections of the outer side face 41A.

This embodiment can provide the effect of suppressing the leak flow of cooling water due to both the jet flows and the venturi means, as in the fuel assembly 1A. In addition, because the four outer side faces 41A are all provided with the venturi means, the effect of suppressing the leak flow of cooling water becomes large in this embodiment than in the foregoing fuel assembly 1A.

The effect due to combined use of the jet flows and the venturi means will be explained below with reference to FIGS. 21-23.

Figure 21:
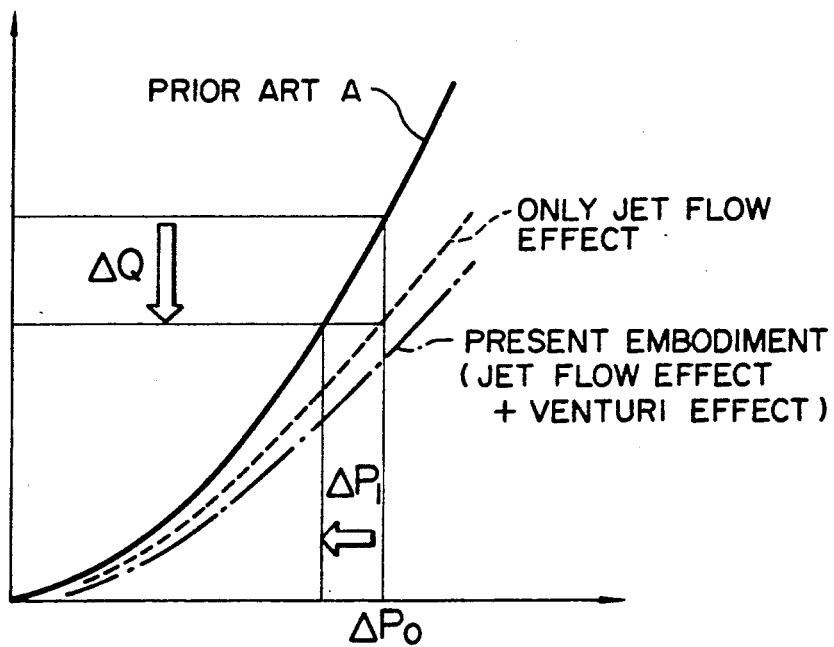
FIG. 21 is a graphical illustration of the relationship of the pressure difference between the inside and outside of the channel box with respect to the leak flow of cooling water.
Figure 22:
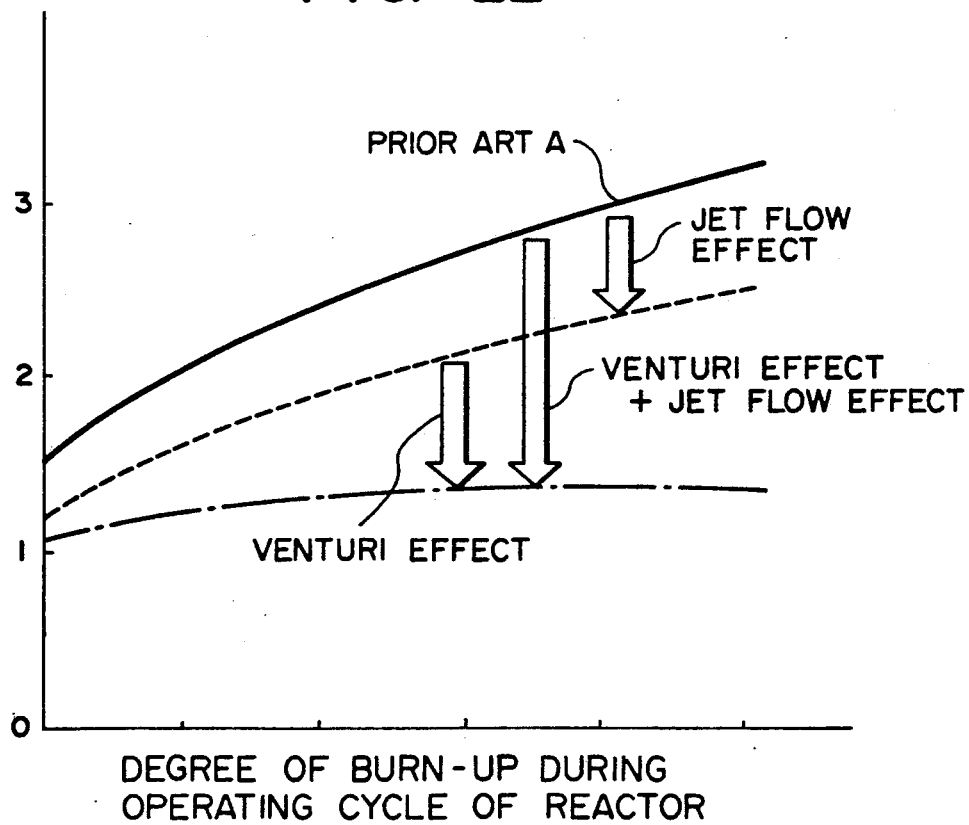
FIG. 22 is a graphical illustration of the changes in the leak flow rate of cooling water versus the degree of burn-up during the operation cycle of a reactor.

FIG. 21 shows dependency of the leak flow of cooling water on the pressure difference $\Delta P$ between the inside and outside of the channel box, i.e., the pressure difference producing a force to drive the leak flow. The leak flow of cooling water is reduced under the action of the jet flows ejected through the cooling water supply holes 18 provided in the grid 40 of the lower tie plate 4B. This effect is indicated by a dotted line in FIG. 21. As seen, generation of the jet flows increases the effect of suppressing the leak flow of cooling water on the order of about 20% as compared with the prior art A. In other words, when the pressure difference between the inside and outside of the channel box is given by $\Delta P_0$, the leak flow of cooling water is reduced in this embodiment by $\Delta Q$ as compared with the prior art A. This corresponds to the fact that the pressure difference between the inside and outside of the channel box is lowered by $\Delta P_1$ under the action of the jet flows to reduce the leak flow of cooling water by $\Delta Q$.

Moreover, in the fuel assembly 1B combining the jet flow effect with the venturi effect, the leak flow of cooling water can be further reduced due to the effect of suppressing a deformation of the channel box by the venturi means in comparison with the case of employing the jet flow effect alone. This synergistic effect was confirmed and experimentally proven. During operation of a reactor, the channel box 8 is subjected to the pressure acting from the interior toward the exterior at all times under the static pressure of cooling water in the cooling water passages 11, etc. and, therefore, a creep deformation occurs in the outward direction. Because of this creep deformation of the channel box, the leak flow of cooling water through the gap between the lower tie plate 4 and the channel box 8 is gradually increased in the prior art A with an increase in the degree of burn-up, as indicated by the solid line in FIG. 22. A rate of this increasing leak flow of cooling water is reduced due to the effect of the jet flows ejected by the flow passage means 18, as indicated by the broken line. Then, in this embodiment employing the venturi means as well, the force attracting the channel box 8 toward the lower tie plate is strengthened to suppress an increase in the creep deformation of the channel box 8. As a result, the effect of suppressing a creep deformation of the channel box by the venturi means is added to the jet flow effect, so that an increase in the leak flow of cooling water with the increased degree of burn-up is more effectively suppressed down to a substantially linear relationship as indicated by a one-dot-chain line in FIG. 22.

The effect of reducing the leak flow of cooling water by combined use of the jet flows and the venturi means will be further explained with reference to FIGS. 23A and 23B.

Figure 23A:
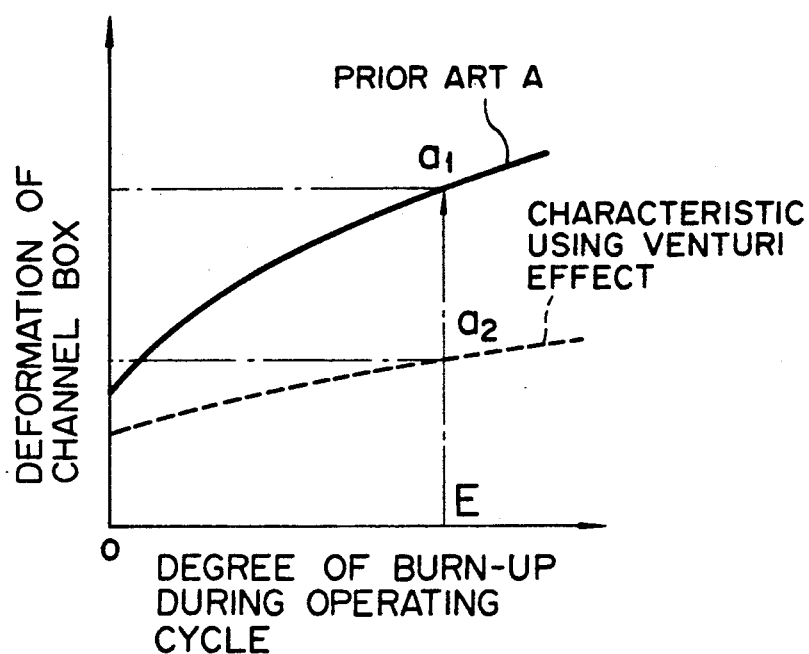
FIGS. 23A and 23B are characteristic graphs an effect obtained by a combination of the jet flow effect and the venturi effect in the fuel assembly in FIG. 1.

FIG. 23A shows changes in the deformation of the channel box with respect t the increased degree of burn-up during the operating cycle for both the prior art A and this embodiment. Given the degree of burn-up being E, the deformation of the channel box in the prior art A is $a_1$, but it is reduced to $a_2$ in this embodiment employing the venturi effect.

Figure 23B:
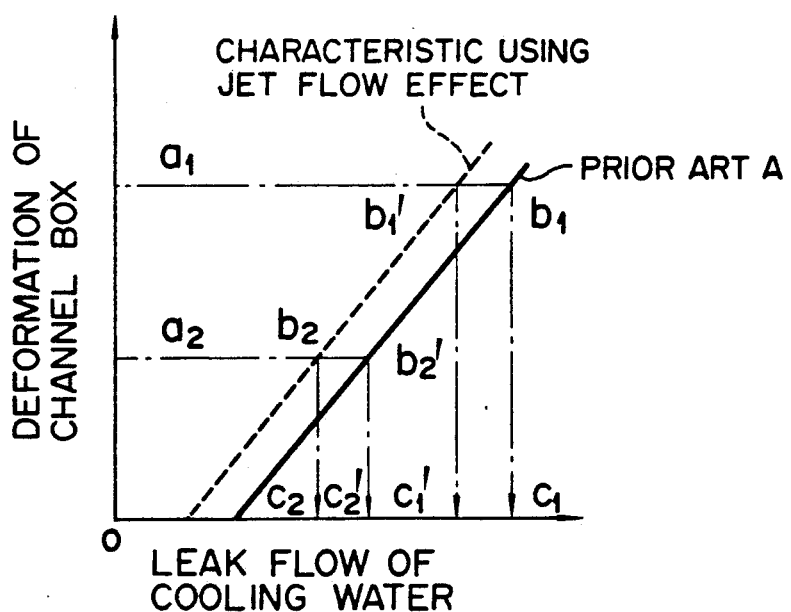

FIG. 23B shows the effect of reducing the leak flow of cooling water dependent on the deformation of the channel box. In the prior art A, there produces the leak flow $c_1$ of cooling water corresponding to a point $b_1$ on the solid line at the deformation $a_1$ of the channel box. In the case of employing the jet flow effect, the leak flow of cooling water is reduced to $c_1'$, corresponding to a point $b_1'$ on the broken line at the same deformation $a_1$ of the channel box. Thus, the effect of reducing the leak flow of cooling water is resulted on the order of $(c_1-c_1')$. When this embodiment is practiced using the venturi means alone, a leak flow $c_2'$, of cooling water is produced corresponding to a point $b_2'$ on the solid line at the deformation $a_2$ of the channel box. This results in the effect of reducing the leak flow of cooling water on the order of $(c_1-c_2')$ as compared with the prior art A. In the case of employing the jet flow effect as well, the leak flow of cooling water is reduced to $c_2'$ corresponding to a point $b_2'$ on the broken line at the same deformation $a_2$ of the channel box. Thus, the effect of reducing the leak flow of cooling water results on the other of $(C_1-C_1')$ as compared with the prior art A. The foregoing can be equally applied, though some difference in degree, to any cases of employing the jet flows and the venturi means is a combined manner.

With this embodiment, as described above, the effect of reducing the leak flow of cooling water is obtained in comparison with the prior art A employing neither the jet flows nor the venturi means. Also, the leak flow of cooling water is reduced in comparison with even the case of employing the jet flows or the venturi means solely.

In order to further improve the function of the venturi means, it is desirable to take into account the following. This is also true for any embodiments having the venturi means.

Figure 20A:
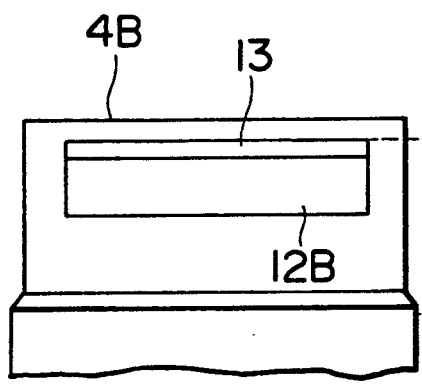
FIGS. 20A and 20B are side views of two side faces of the lower tie plate in FIG. 18 which are adjacent to each other with one corner therebetween.
Figure 20B:
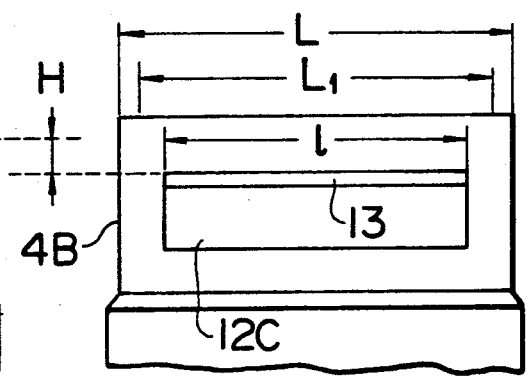

Each outer side face 41A of the lower tie plate 4 is smoothly joined to the adjacent outer side face 41A via the arcuate surface of radius R (FIG. 10), so that the channel box 8 can be easily inserted to the lower tie plate 4 during assembly. Assuming now that each outer side face 41A of the lower tie plate 4 has a width L and the flat portion of the outer side face 41A has a width $L_f$ as shown in FIG. 20B, the relationship of $Lf=L-2R$ holds. Also, assuming that the recess 12 provided with the venturi means has a width l, with the width l being preferably in the range of 0.5-1.0 with respect to the width $L_f$ of the flat portion of the lower tie plate 4. That is:

$$l/L_f = 0.5 - 1.0 \tag{3}$$

As will be understood from the foregoing equation (1), the effect of the venturi means is developed by utilizing the flow speed of cooling water leaked, i.e., the dynamic pressure. In this respect, the effect of suppressing an outward deformation of the channel box 8 by the negative pressure difference $\Delta P$ acts on the central portions of the four sides of the channel box 8 in a greater degree than on the four corners of the channel box 8 and their neighboring areas. Therefore, even if the venturi means is provided in the vicinity of the four corners of the channel box 8, the effect of suppressing an outward deformation of the channel box 8 would be small. Further, the pressure loss coefficient of a portion of the cooling water passage 17 provided with the venturi means is reduced to about ½ in comparison with other portion thereof provided with no venturi means, whereby the cooling water is more likely to leak in the former portion. Accordingly, if the venturi means is provided in the vicinity of the four corners of the channel box 8, the leak flow of cooling water would be rather increased uselessly.

Figure 24A:
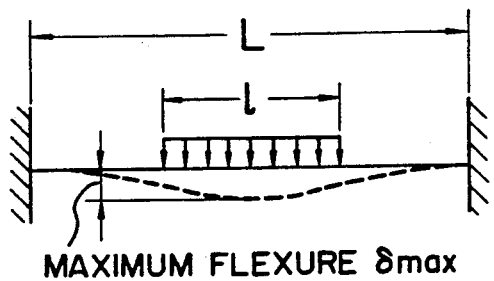
FIG. 24A is a schematic view of a flexure of a beam as produced when an evenly distributed load is applied to the beam with a length of L.
Figure 24B:
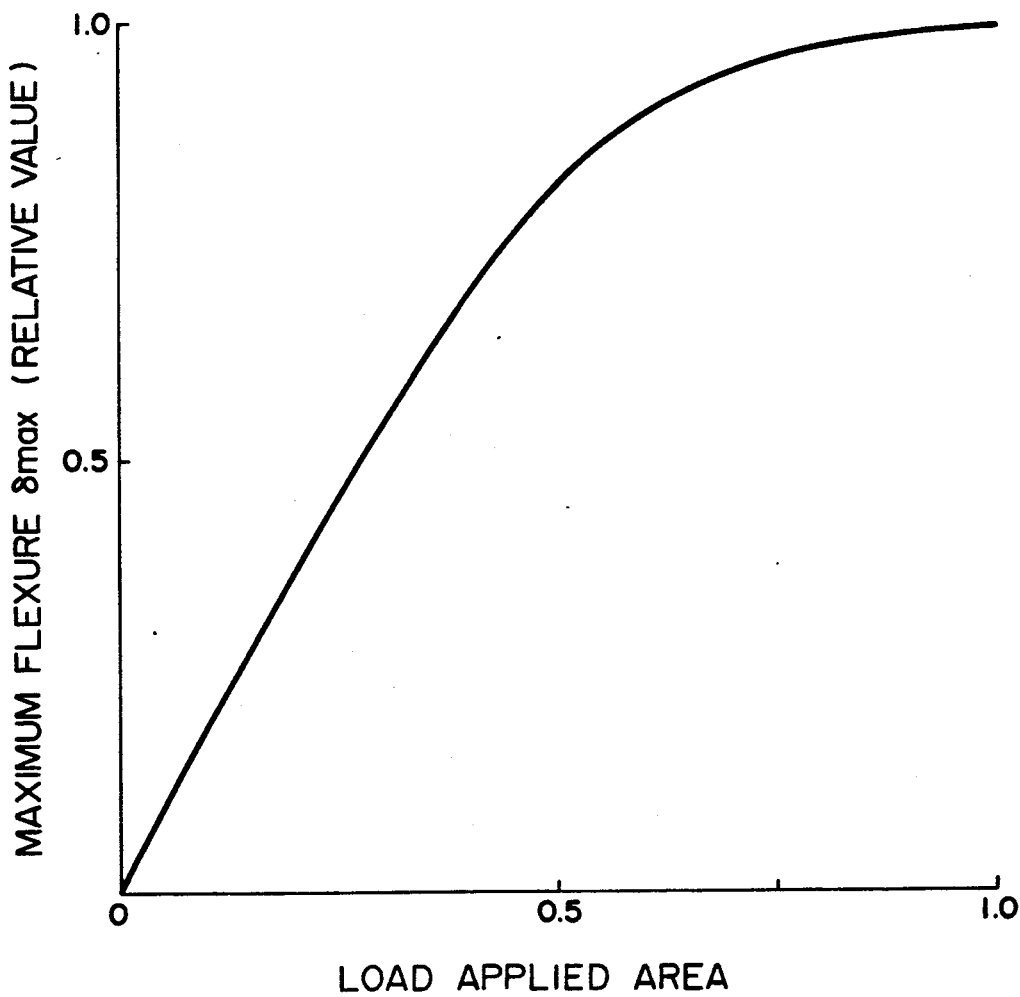
FIG. 24B is a graphical illustration of the relationship between maximum flexure of the channel box and a load range.

FIGS. 24A and 24B show maximum flexure (relative value) of a beam as produced when an evenly distributed load is applied to the beam with a length of L. As the length l of a portion or area of the beam to which the evenly distributed load is applied is increased, so is the flexure. However, when the ratio of the length l of the portion undergoing the evenly distributed load to the length L of the beam exceeds 0.5, an increase rate of the flexure is reduced.

Figure 25A:
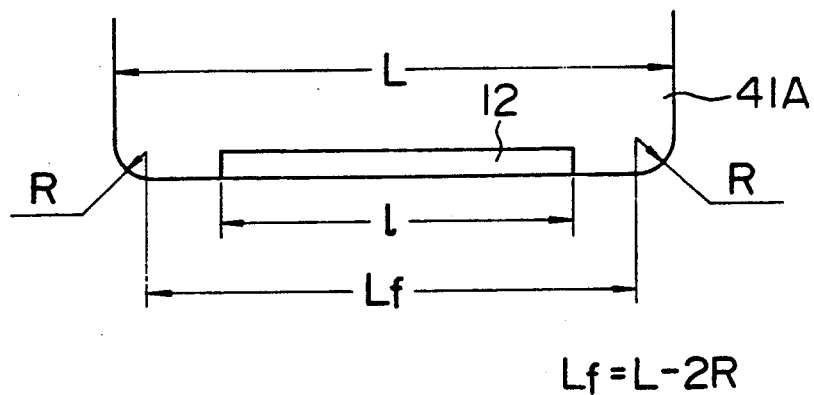
FIG. 25A is a schematic side view of the tie plate with a recess.
Figure 25B:
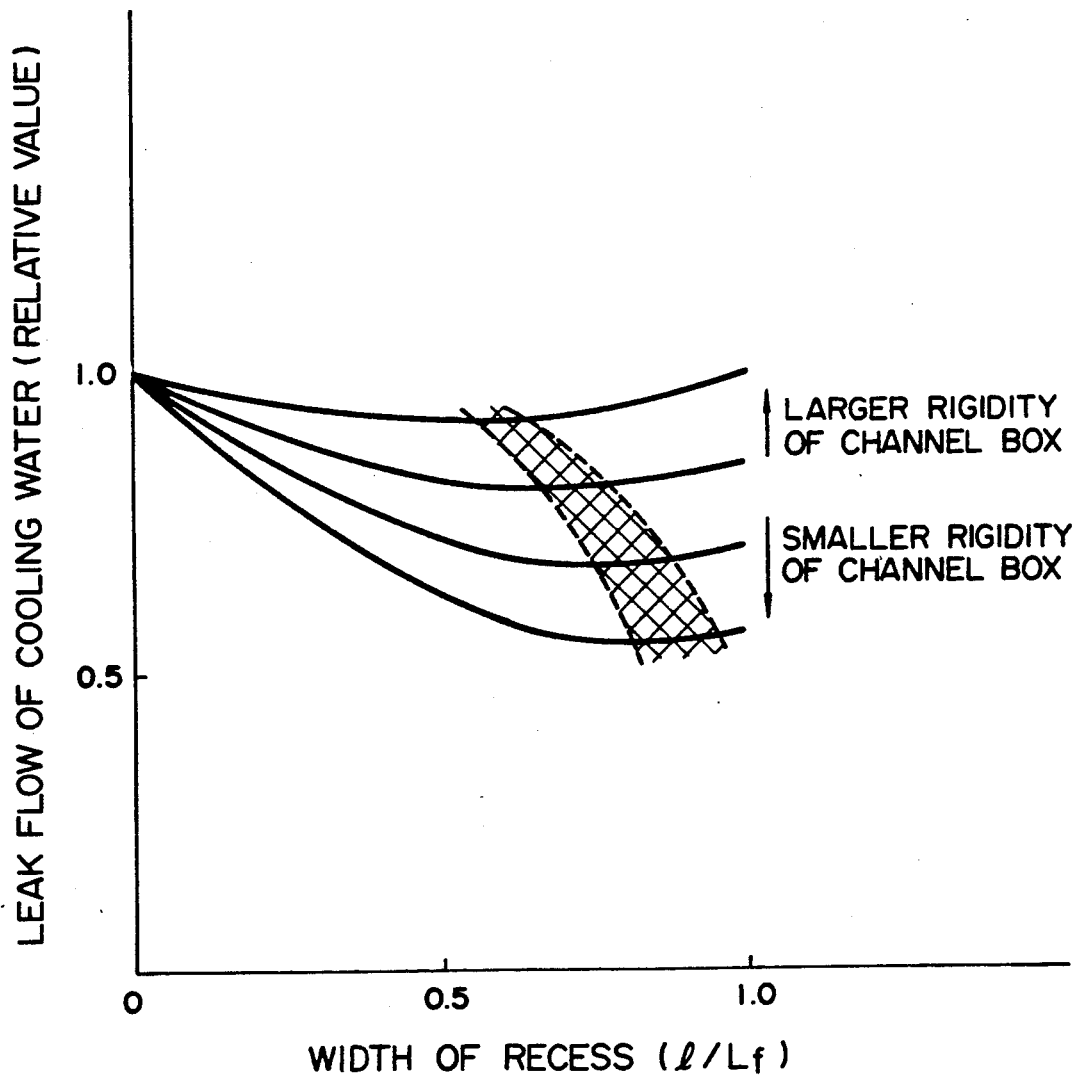
FIG. 25B is a graphical illustration of the relationship between the width of a recess constituting venturi means and the leak flow of cooling water.

From the above standpoint, it is preferable that the width l of the recess 12 constituting the venturi means be not smaller than 0.5, but not larger than 1.0 with respect to the width $L_f$ of the flat portion of the outer side face 41A. This condition will be described in more detail with reference to FIG. 25. FIGS. 25A and 25B show the relationship between the width ($l/L_f$) of the recess 12 provided in the tie plate side face and the leak flow of cooling water (relative value) with rigidity of the channel box 8 being as a parameter. The rigidity of the channel box 8 wa changed by using a zirconium alloy plate, which is a currently used material and has a thickness of 2 mm-3 mm in practical use, and varying its thickness over the range of about 1.5 mm-4 mm. As the wall of the channel box 8 is thickened (to increase the rigidity), the deformation of the channel box becomes smaller than produced by the channel box having the thinned wall (to decrease the rigidity), when a constant load is applied thereto. For the same reason, the relative leak flow of cooling water is reduced with an increase in the width of the recess 12 until a certain extent. Then, the cross-hatched area in FIG. 25 represents a range where the leak flow of cooling water is minimized. The width of the recess 12 corresponding to that range approaches 1.0 as the rigidity of the channel box is reduced. Consequently, the effect of the venturi means can be effectively developed when the width l of the recess 12 is set in the range of 0.5-1.0 with respect to $L_f$.

Figure 26:
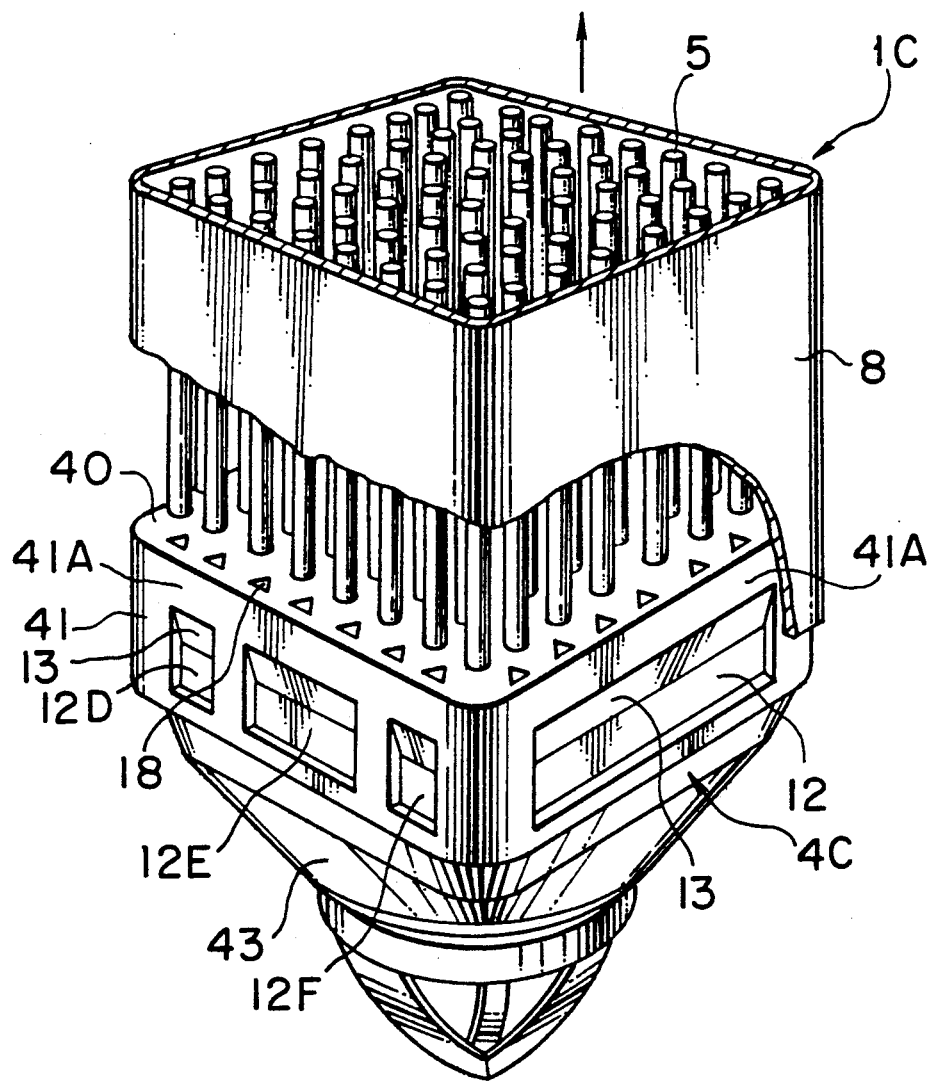

A fuel assembly 1C according to still another embodiment of the present invention is shown FIG. 26. The fuel assembly 1C includes a lower tie plate 4C which has two pairs of outer side faces 41A opposite to each other and which is provided with three independent recesses 12D -12F in one of each pair of the opposite outer side faces 41A and a single recess 12 in the other outer side face. Thus, the recesses 12D-12F are provided in each of the two outer side faces 41A opposite to each other. The recess 12 is also provided in each of the two outer side faces 41A opposite to each other. These recesses are all located at the same vertical level. The attraction force generated by the venturi means including the three recesses 12D-12F is different from the attraction force produced by the venturi means including the recess 12 at all times during operation of a reactor. The latter attraction force is greater than the former. Accordingly, the attraction forces acting on each pair of the two outer side faces of the channel box 8 opposite to each other are produced such that the attraction force acting on either one of the outer side faces is always greater, as with the fuel assembly 1A. With this embodiment, therefore, since the side wall of the channel box 8 undergoing the greater attraction force is always attracted toward the lower tie plate 4C, the first vibration generating cause can be solved and vibrations of the channel box 8 can be suppressed. Except for arrangement of the recesses, the fuel assembly 1C provides the similar working effect to that in the fuel assembly 1B.

In other words, the fuel assembly 1C is constructed in like manner to the fuel assembly 1B except for arrangement of the venturi means and, therefore, can provide both the jet flow effect and the venturi effect like the fuel assembly 1B.

This embodiment is one of examples that the recesses provided in the two opposite outer side faces 41A are different in their shape from each other. Specifically, in this example, the recesses provided in the two opposite outer side faces 41A are different from each other in shape as viewed from the front of the corresponding outer side face 41A, or taken along the cross or vertical section of the outer side face 41A. The following embodiments shown in FIG. 27, etc. also belong to those examples.

Figure 27:
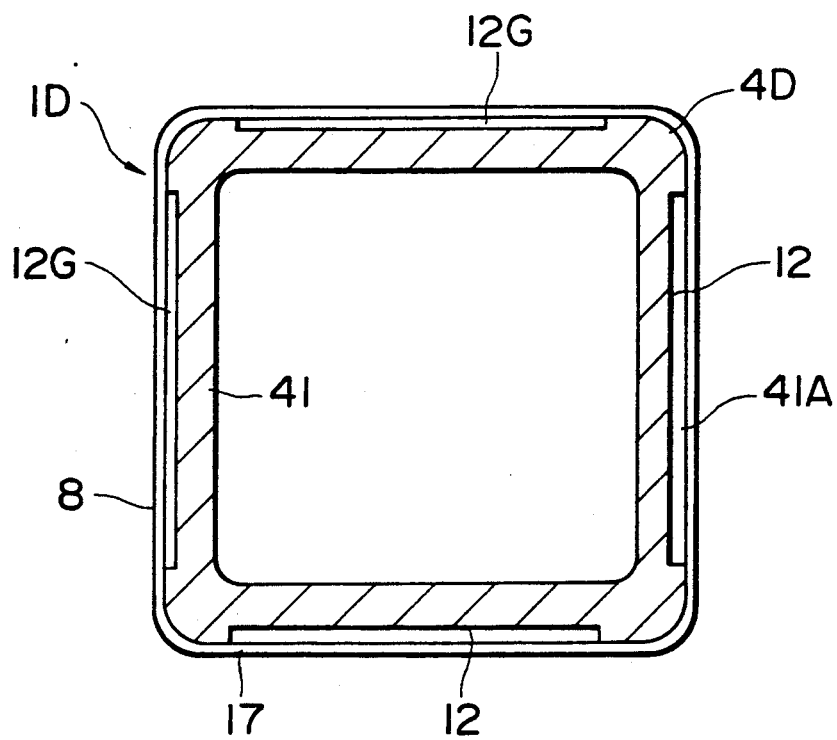
FIG. 27 is a cross-sectional view of the lower tie plate in FIG. 26.

FIG. 27 shows a fuel assembly 1D according to still another embodiment of the present invention which is featured in making attraction forces of different magnitudes act on two opposite side faces of the channel box 8. More specifically, in the fuel assembly 1D, recesses 12 and 12G having their width b different from each other are provided in each pair of two outer side faces 41A of a lower tie plate 4D opposite to each other, respectively. The attraction force produced by the venturi means including the recess 12G with the shallower depth b becomes smaller than that produced by the venturi means including the recess 12 with the deeper depth b. This embodiment can also solve the first vibration generating cause and suppress vibrations of the channel box 8.

It is further possible to make attraction forces of different magnitudes act on two opposite side faces of the channel box 8, by changing the angle θ of the inclined surface 13 of the recess 12 for each of the two opposite outer side faces 41A of the lower tie plate. This modification can also solve the first vibration generation cause.

Figure 28:
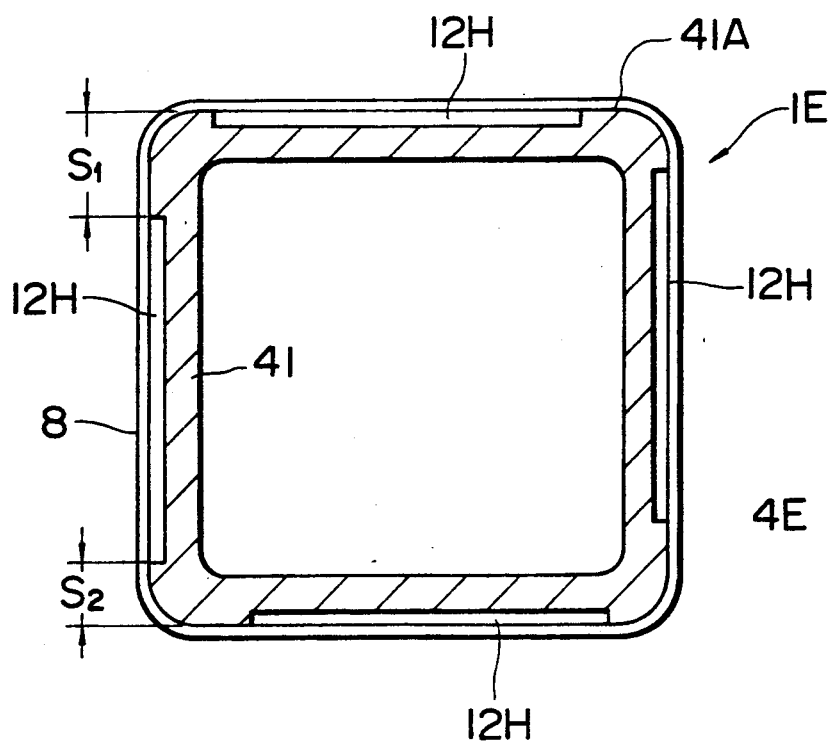
FIG. 28 is a cross-sectional view of a lower tie plate of a fuel assembly according to another embodiment of the present invention.

FIG. 28 shows a fuel assembly 1E according to still another embodiment of the present invention in which attraction forces act on two opposite side faces of the channel box 8 at different regions. More specifically, recesses 12H are provided in each pair of two opposite outer side faces 41A of a lower tie plate 4E at respective positions relatively shifted from each other in the horizontal direction. This is effected by making both side edges of each recess 12H spaced from the adjacent orthogonal outer side faces 41A by different distances $S_1$ and $S_2$ respectively. Thus, attraction forces produced by the venturi means act on the two opposite side faces of the channel box 8 at points different from each other. With this embodiment, therefore, such different acting points of the attraction forces produces torque on the channel box 8 in its cross-section, so that four corners of the lower tie plate 4E are brought into contact with the inner surface of the channel box 8 to suppress vibrations of the channel box 8. In this way, the fuel assembly 1E can also solve the first vibration generating cause and suppress vibrations of the channel box 8.

The embodiments of FIGS. 27 and 28 are constructed in like manner to the fuel assembly 1B except for arrangement of the venturi means.

Figure 29A:
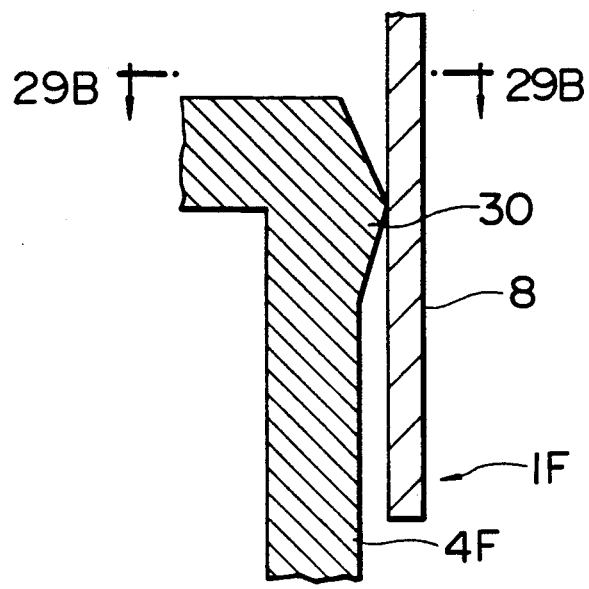
FIG. 29A is a sectional view of a part of a lower tie plate and a neighboring area of a fuel assembly according to yet another embodiment of the present invention taken along the line 29A—29A in FIG. 29B.
Figure 29B:
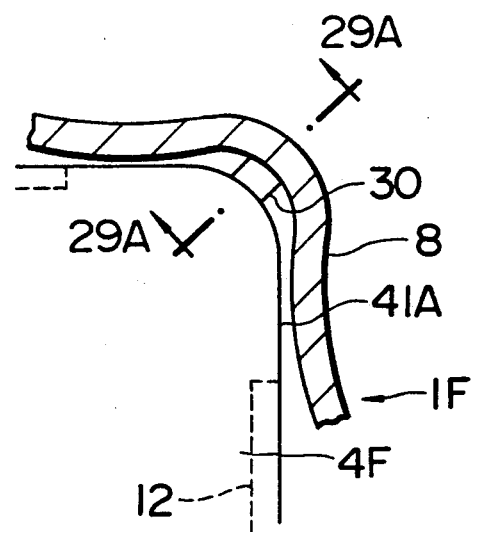
FIG. 29B is a cross-sectional view taken along the line 29B—29B in FIG. 29A.

FIGS. 29A and 29B show a fuel assembly 1F according to still another embodiment of the present invention. The portion of the fuel assembly 1F not shown in FIG. 29 is the same as the fuel assembly 1A. The recess 12 is provided in each of the four outer side faces 41A. With this arrangement only, the channel box 8 is caused to vibrate at its lower end portion like the fuel assembly 1. In order to prevent such vibrations of the channel box 8, this embodiment has a projection 30 provided at each corner of a lower tie plate 4F between the adjacent outer side faces 41A to extend outwardly. The projection 30 is sized to be held in contact with the inner surface of the corresponding corner of the channel box 8. The projection 30 functions to suppress the vibration of the channel box 8 in the horizontal direction. Thus, the projection 30 serves as vibration suppressing means.

Fuel assemblies according to other embodiments of the present invention which include other examples of the vibration suppressing means will be described below. The following embodiments of respective fuel assemblies shown in FIGS. 30-39 have the vibration suppressing means for solving the second vibration generating cause. These embodiments can suppress the leak flow of cooling water based on both the jet flow effect and the venturi effect, as with the fuel assembly 1B.

Figure 30:
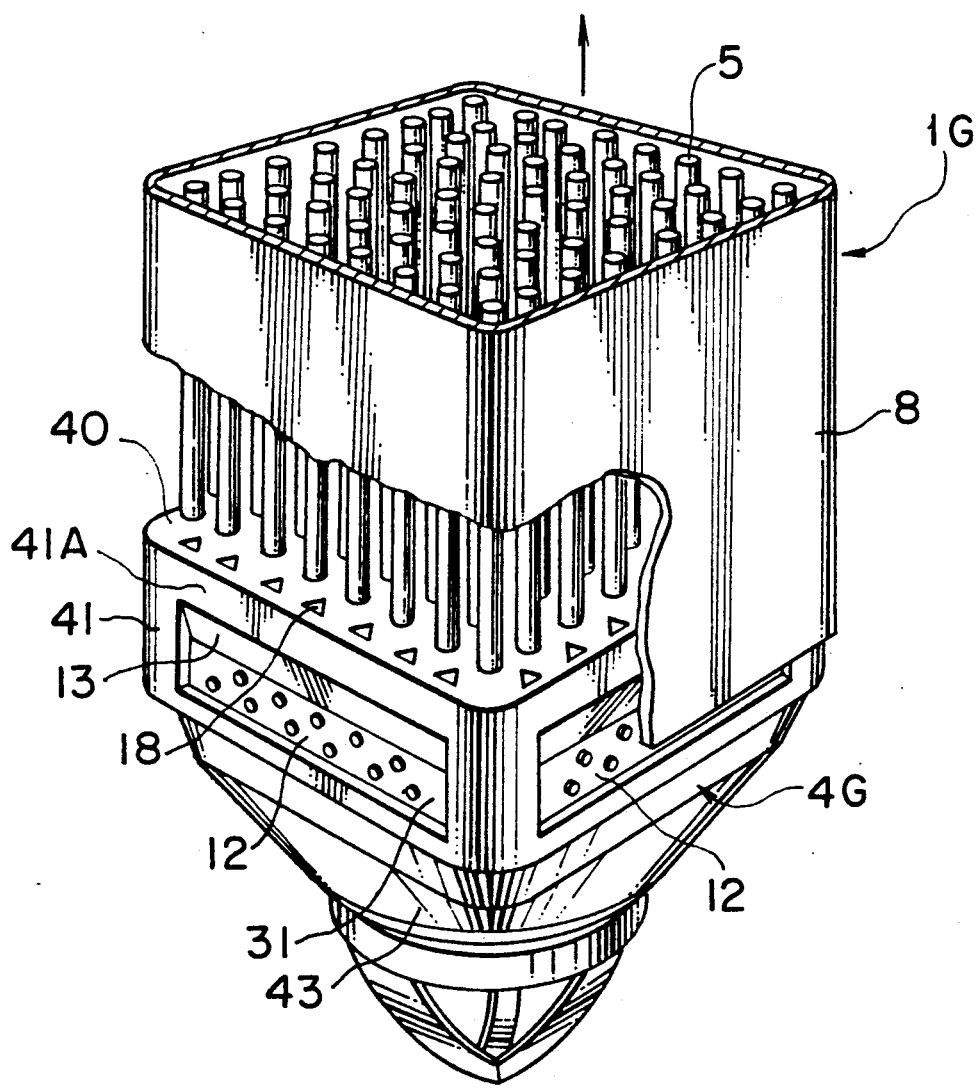
Figure 31:
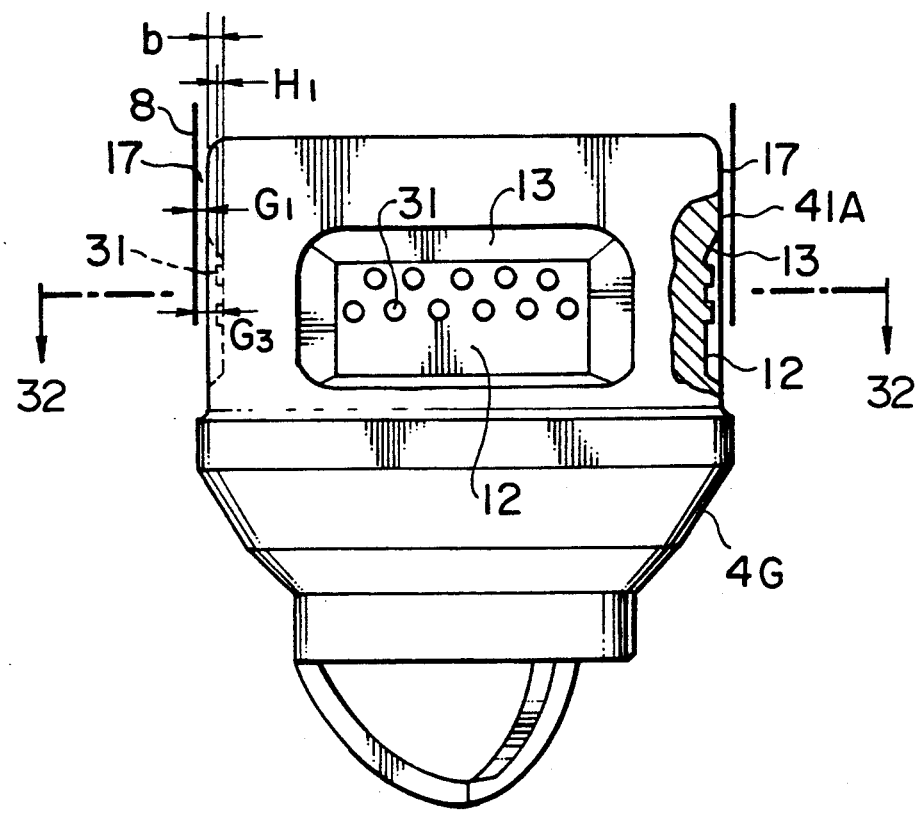
FIG. 31 is a side view of the lower tie plate in FIG. 30.
Figure 32:
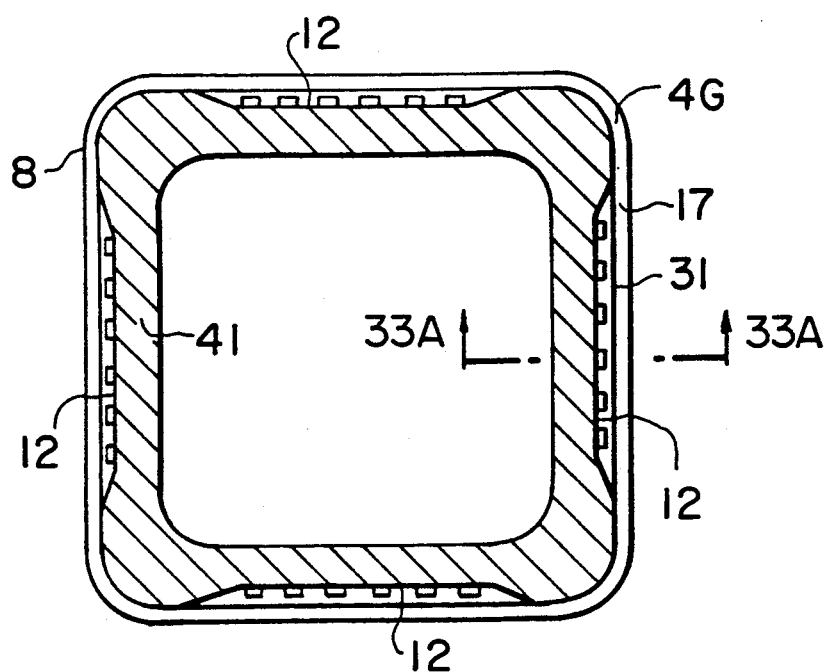
FIG. 32 is a sectional view taken along the line 32—32 in FIG. 31.

FIGS. 30-32 show a fuel assembly 1G according to one of other embodiments of the present invention. A lower tie plate 4G of the fuel assembly 1G has a recess 12 provided in each of its four outer side faces 41A. The recesses 12 are all located at the same vertical level. In addition, a plurality of column-like projections, i.e., column-like vortex stabilizers 31, are provided in each recess 12. The vortex stabilizers 31 are arranged in a pattern of two rows spaced in the axial direction of the lower tie plate 4G The vortex stabilizers 31 on the upstream side are each arranged between adjacent pairs of the vortex stabilizers 31 on the downstream side in the horizontal direction. If the height $H_1$ of each vortex stabilizer 31 (i.e., the height from the bottom surface 12A) exceeds the depth 1 of the recess 12, the venturi effect would not be developed. Therefore, the height $H_1$ is required to be smaller than the value of the depth b. In other words, the width G of a gap between the inner surface of the channel box 8 and the upper end of the vortex stabilizer 31 is greater than the width $G_1$ of a gap between the inner surface of the channel box 8 and the outer side face 41A of the lower tie plate 4G. Except for the structure of the recess 12 provided with the vortex stabilizers 31, the fuel assembly 1G is constructed in a like manner to the foregoing fuel assembly 1A (FIGS. 8-11).

Figure 33A:
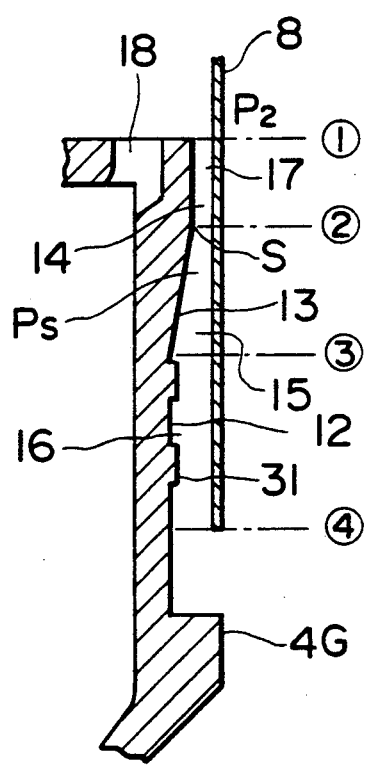
FIG. 33A is a vertical sectional view, taken along the line 33A—33A in FIG. 32, of the lower tie plate and the channel box.
Figure 33B:
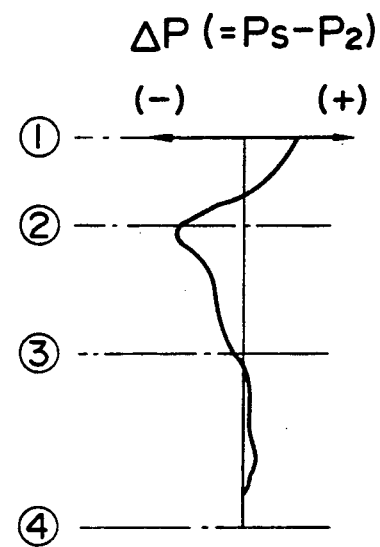
FIG. 33B is a schematic view of a distribution of the static pressure, corresponding to FIG. 33A, within a cooling water passage in FIG. 30.

During operation of a reactor, the cooling water in the cooling water passages 11 above the lower tie plate 4G flows into the cooling water passage 17 Let it be assumed that the pressure outside the channel box 8 is $P_2$ and the static pressure within the cooling water passage 17 is $P_s$. FIGS. 33A and 33B show distribution of the static pressure resulted from the effect of the venturi means and the vortex stabilizers 31 both included in the cooling water passage 17. The distribution of the of the static pressure is plotted with the pressure $P_2$ as a reference. At the inlet of a gap 14 (i.e., the point ①), the pressure difference $\Delta P$ ($=P_s-P_2$) is positive. At the start point S of the inclined surface 13 (i.e., the point ②), the static pressure $P_s$ is minimized and $\Delta P$ takes a minimum negative value. Because, the flow sectional area is gradually increased in the region of a gap 15, the static pressure $P_s$ is gradually restored and the value of $\Delta P$ approaches zero (0). The vortex stabilizers 31 provided in the region of a gap 16 give resistance against a stream of the cooling water. The stream of the cooling water flowing into the gap 16 disturbed to such a large extent that the static pressure $P_s$ in the gap 16 exceeds the pressure $P_2$ in the most region of the gap 16. Accordingly, at the outlet of the cooling water passage 17, no static pressure $P_s$ is produced which is lower than the pressure $P_2$ throughout the outer circumference of the lower tie plate in a cross-section. In addition, the fluid resistance given by the vortex stabilizers 31 serves to essentially uniformalize the flow speed of cooling water with the cooling water passage 17 in the horizontal direction. Therefore, the stream of the cooling water flowing through the gaps 15 and 16 is stabilized by not being affected by fluctuations in frictional resistance caused by the wall surface of the lower tie plate defining the cooling water passage 17. This prevents occurrence of the drawn-in flow $FL_1$ shown in FIGS. 7B and 7C. As a result, this embodiment can solve the second vibration generating cause and suppress vibrations of the channel box 8.

In connection with this embodiment, it is required that $a$ in the above equation (2) be set so as to avoid the vortex stabilizers 31 from being positioned below the lower end of the channel box 8, even when the lower end of the channel box 8 is moved upwardly to bring about such a shift as from $L_0$ to $L_1$ with the increased degree of burn-up.

In this embodiment, the four outer side faces 41A of the lower tie plate 4G all have the same shape, and the recesses 12 are all at the same vertical level. Accordingly, this embodiment facilitates machining in manufacture of the lower tie plate 4G, and requires no special car to orientation of the lower tie plate 4G during assembly of the fuel assembly.

Figure 34:
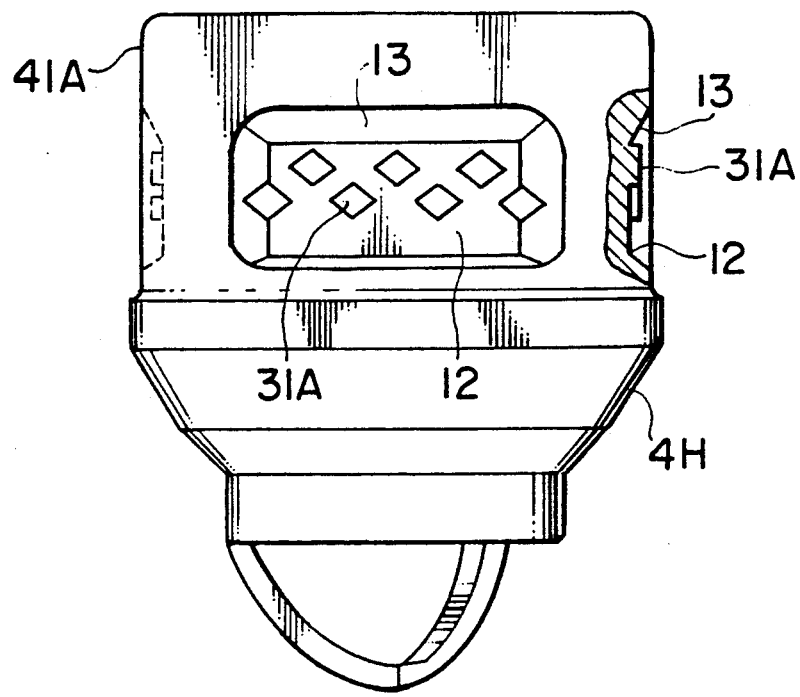
FIGS. 34, 35, 36, 37, 38 and 39 are side views of respective lower tie plates included in fuel assemblies according to other embodiments of the present invention.

A fuel assembly according to an other embodiment of the present invention is shown in FIG. 34. FIG. 34 illustrates a lower tie plate 4H of the fuel assembly according to this embodiment. The lower tie plate 4H has a plurality of vortex stabilizers 31A in two rows of projections which have a rhombic shape as viewed from front and are provided in the recess 12 formed in each of the four outer side faces 41A. Except for the structure of the vortex stabilizers, the fuel assembly of this embodiment is constructed in a like manner to the fuel assembly 1G. Since the vortex stabilizers 31A function similarly to the vortex stabilizers 31, this embodiment can also suppress vibrations of the channel box.

Figure 35:
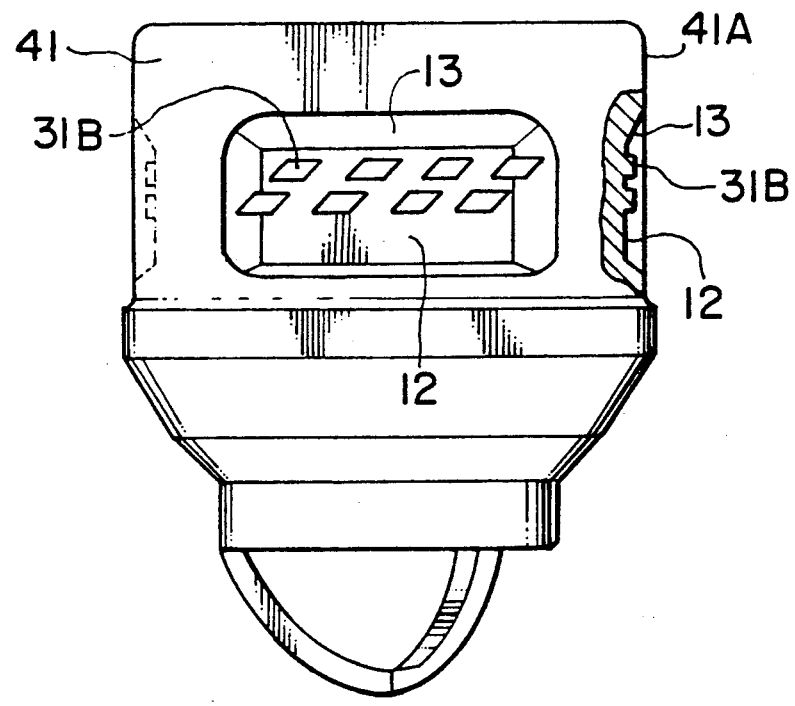

FIG. 35 shows a lower tie plate 41 included in a fuel assembly according to an other embodiment of the present invention. The lower tie plate 41 has a plurality of vortex stabilizers 31B provided in each recess 12 in two rows vertically spaced from each other. The vortex stabilizers 31B are projections being parallelogrammatic as viewed from front.

Figure 36:
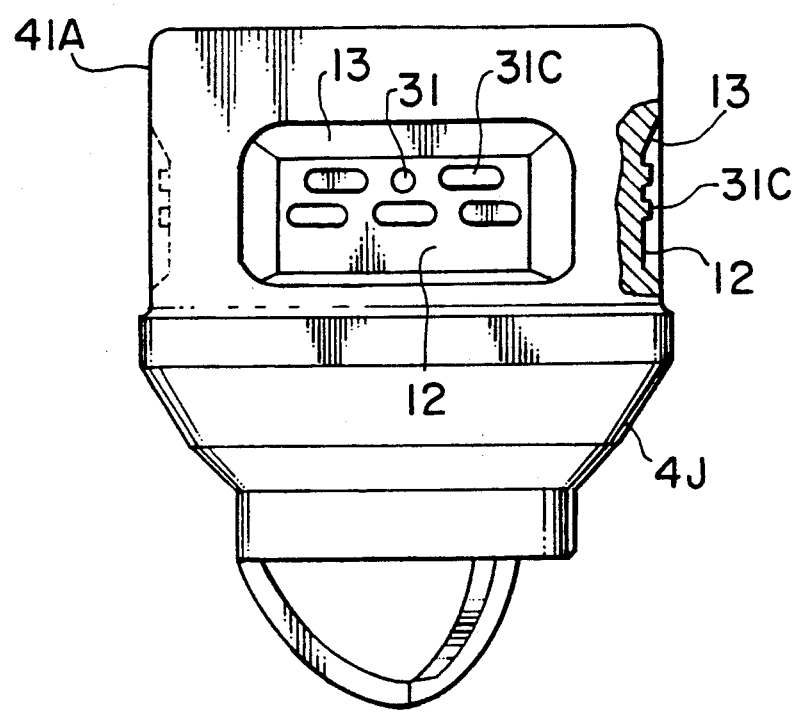

FIG. 36 shows a lower tie plate 4J included in a fuel assembly according to an other embodiment of the present invention. The lower tie plate 4J has a plurality of vortex stabilizers 31C provided in each recess 12 in two rows. One column-like vortex stabilizer 31 is arranged between the vortex stabilizers 31C in the upper row. The vortex stabilizers 31C are projection being oval as viewed from front.

Figure 37:
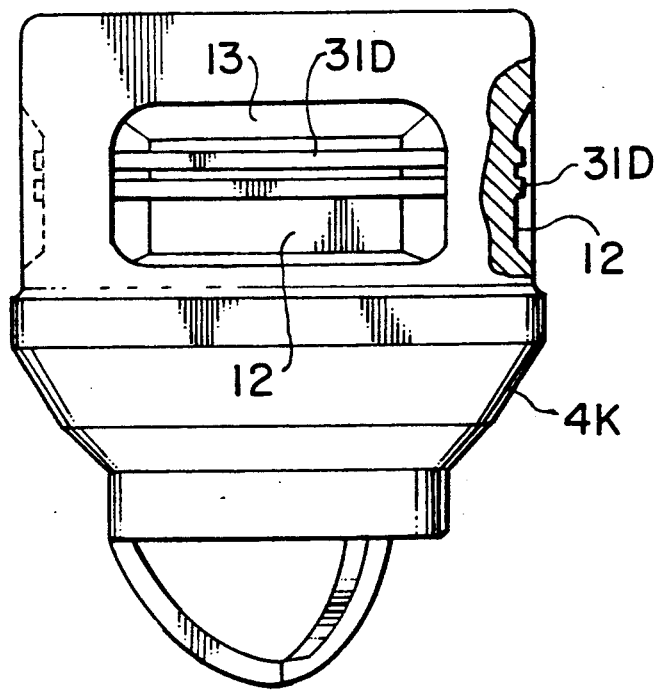

FIG. 37 shows a lower tie plate 4K included in a fuel assembly according to an other embodiment of the present invention. The lower tie plate 4K has vortex stabilizers 31D provided in each recess 12 in two rows vertically spaced from each other. The vortex stabilizers 31D are elongate projection being continuously extended across the recess horizontally.

Figure 38:
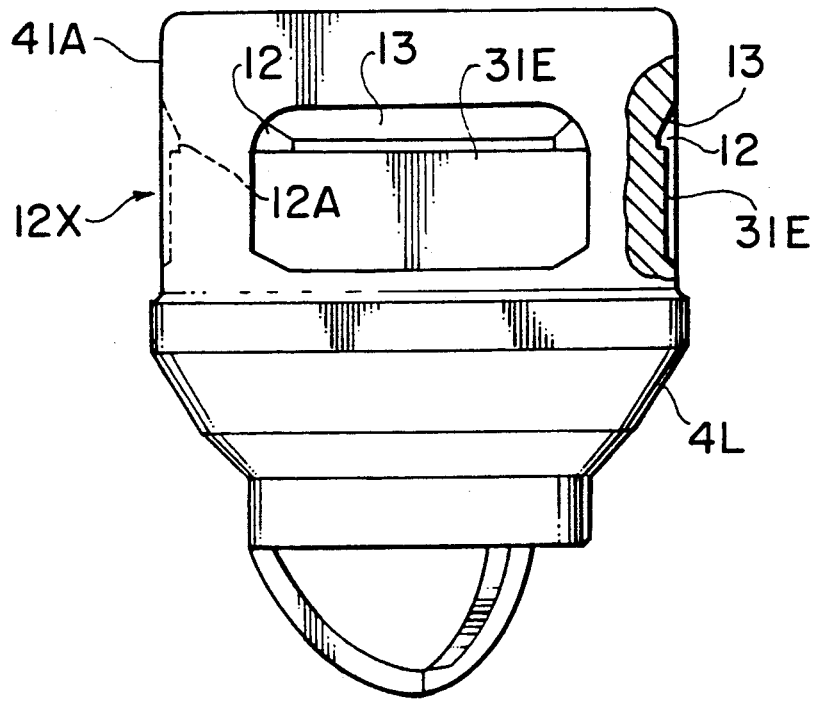

FIG. 38 shows a lower tie plate 4L included in a fuel assembly according to an other embodiment of the present invention. The lower tie plate 4L has a vortex stabilizer 31E provided in each recess 12. The vortex stabilizer 31E is a flat surface located at a shallower position than the deepest portion (i.e., the bottom surface 21A) of the recess 12. The provision of the vortex stabilizer 31E forms a step portion 12x stepped outwardly of the deepest portion and along the axial of the lower tie plate 4L. The vortex stabilizer 31E is spread over the entire region of the recess 12 below the step portion 12x. Also, the vortex stabilizer 31E is located at such a depth closer to the deepest portion of the recess 12 than to the outer side face 41A.

Figure 39:
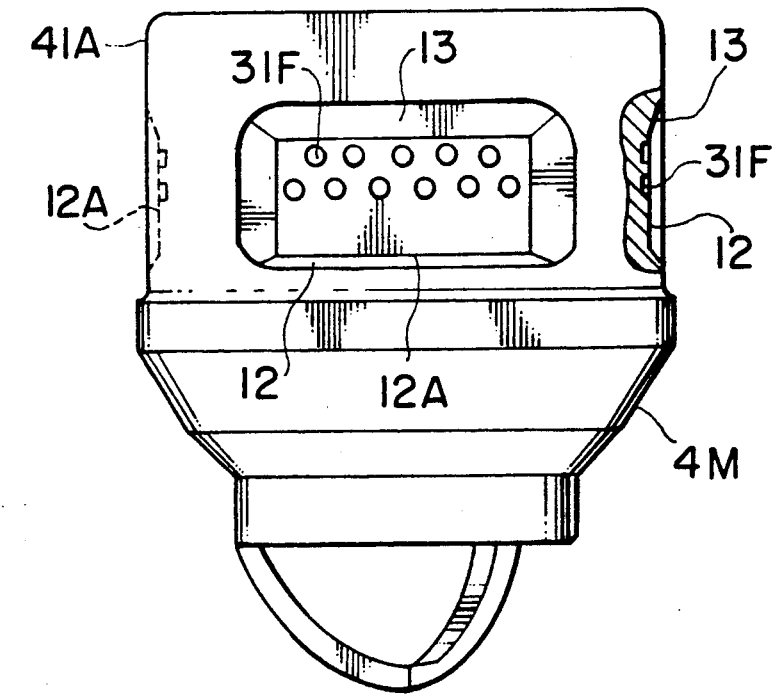

FIG. 39 shows a lower tie plate 4M included in a fuel assembly according to an other embodiment of the present invention. The lower tie plate 4M has a plurality of vortex stabilizers 31F provided in each recess 12 in two rows vertically spaced from each other. The vortex stabilizers 31F are holes formed in the bottom surface 12A of the recess 12 and are circular as viewed from front. The vortex stabilizers 31F due not penetrates through a tubular side wall 41 of the lower tie plate 4M.

What is claimed is:

1. A fuel assembly comprising a plurality of fuel rods each having an upper end and a lower end, a lower tie plate for supporting the lower ends of said fuel rods and having a plurality of coolant openings through which a coolant is supplied to spaces between said fuel rods, and a channel box surrounding a bundle of said fuel rods and having a lower end portion to surround the circumference of said lower tie plate to thereby define a coolant leak passage between said lower tie plate and said channel box, wherein said fuel assembly includes means for generating a force that acts on a part of said channel box and attracts said channel box toward said lower tie plate, under the action of a leak stream of the coolant passing through said coolant leak passage, and other means provided in said lower tie plate for suppressing vibrations of said channel box.

2. A fuel assembly according to claim 1, wherein said attraction force generating means is a venturi section in said coolant leak passage.

3. A fuel assembly according to claim 1, wherein said lower tie plate has means including outermost ones of said coolant openings and producing coolant flows adapted to suppress a leak of the coolant through said coolant leak passage.

4. A fuel assembly according to claim 1, wherein the dimension between a portion of the inner peripheral surface of each outermost one of said coolant openings, which is nearest to an outer side face of said lower tie plate, and said outer side face is smaller than a thickness of a side wall of said lower tie plate.

5. A fuel assembly according to claim 1, wherein the dimension between a portion of the inner peripheral surface of each outermost one of said coolant openings, which is a nearest to an outer side face of said lower tie plate, and the center axis of said lower tie plate is larger than the dimension between an inner side face of said lower tie plate and the center axis of said lower tie plate.

6. A fuel assembly according to claim 1, wherein said lower tie plate has a plurality of fuel rod attachment openings into which the lower ends of said fuel rods are inserted, respectively, and each outermost one of said coolant openings is positioned at its part outwardly of outermost ones of said fuel rod insertion openings.

7. A fuel assembly according to claim 6, wherein said each outermost one of said coolant openings comprises one portion which is positioned outwardly of outermost ones of said fuel rod insertion openings, and the other portion which is positioned between adjacent of said outermost fuel rod insertion openings, said one portion having a horizontal width greater than that of the other portion.

8. A fuel assembly comprising a plurality of fuel rods each having an upper end and a lower end, a lower tie plate for supporting the lower ends of said fuel rods and having a plurality of coolant openings through which a coolant is supplied to spaces between said fuel rods, and a channel box surrounding a bundle of said fuel rods and having a lower end portion to surround the circumference of said lower tie plate to thereby define a coolant leak passage between said lower tie plate and said channel box, wherein said fuel assembly includes means for making a first static pressure of the coolant in a partial region in said coolant leak passage smaller than a second static pressure of the coolant outside said channel box, and means provided in said lower tie plate for suppressing vibrations of said channel box caused by said first static pressure being made smaller than said second static pressure.

9. A fuel assembly comprising a plurality of fuel rods each having an upper end and a lower end, a lower tie plate for supporting the lower ends of said fuel rods and having a plurality of coolant openings through which a coolant is supplied to spaces between said fuel rods, and a channel box surrounding a bundle of said fuel rods and having a lower end portion to surround the circumference of said lower tie plate to thereby define a coolant leak passage between said lower tie plate and said channel box, wherein said fuel assembly includes means for generating a force that acts on a partial region on a side face of said channel box and attracts said channel box toward said lower tie plate, under the action of a leak stream of the coolant passage through said coolant leak passage, and said attraction force generating means is provided such that said region subjected to said attraction force is located differently between each pair of side faces of said channel box opposite to each other.

10. A fuel assembly according to claim 9, wherein said attraction force generating means is a venturi section in said coolant leak passage.

11. A fuel assembly comprising a plurality of fuel rods each having an upper end and a lower end, a lower tie plate for supporting the lower ends of said fuel rods and having a plurality of coolant openings through which a coolant is supplied to spaces between said fuel rods, and a channel box surrounding a bundle of said fuel rods and having a lower end portion to surround the circumference of said lower tie plate to thereby define a coolant leak passage between said lower tie plate and said channel box, wherein said fuel assembly includes means for generating a force that acts on a partial region on a side face of said channel box and attracts said channel box toward said lower tie plate, under the action of a leak stream of the coolant passing through said coolant leak passage, said attraction force generating means is provided such that said attraction force is generated to act on said region on at least one of each pair of side faces of said channel box opposite to each other, and when said attraction force is generated to act on said regions on both of each pair of opposite side faces of said channel box, said attraction force generating means is provided such that said attraction forces acting on said regions are different in magnitude from each other.

12. A fuel assembly according to claim 11, wherein said attraction force generating means is a venturi section in said coolant leak passage.

13. A fuel assembly comprising a plurality of fuel rods each having an upper end and a lower end, a lower tie plate for supporting the lower ends of said fuel rods and having a plurality of coolant openings through which a coolant is supplied to spaces between said fuel rods, and a channel box surrounding a bundle of said fuel rods and having a lower end portion to surround the circumference of said lower tie plate to thereby define a coolant leak passage between said lower tie plate and said channel box, wherein said fuel assembly includes means for generating a force that acts on a part of said channel box and attracts said channel box toward said lower tie plate, under the action of a leak stream of the coolant passing through said coolant leak passage, and a member resisting against the coolant stream but not impeding generation of said attraction force is provided in said lower tie plate to locate in said coolant leak passage on the downstream side of said attraction force generating means.

14. A fuel assembly comprising a plurality of fuel rods each having an upper end and a lower end, a lower tie plate for supporting the lower ends of said fuel rods and having a plurality of coolant openings through which a coolant is supplied to spaces between said fuel rods, and a channel box surrounding a bundle of said fuel rods and having a lower end portion to surround the circumference of said lower tie plate to thereby define a coolant leak passage between said lower tie plate and said channel box, wherein said fuel assembly includes means for making a first static pressure of the coolant in a partial region in said coolant leak passage smaller than a second static pressure of the coolant outside said channel box, and means provided in said lower tie plate for raising a static pressure of the coolant at an outlet of said coolant leak passage, which is positioned downstream of said region producing said first static pressure, above said second static pressure through-out a cross-sectional area of said outlet.

15. A fuel assembly comprising a plurality of fuel rods each having an upper end and a lower end, and a lower tie plate for supporting the lower ends of said fuel rods and having a plurality of coolant openings through which a coolant is supplied to spaces between said fuel rods, wherein said lower tie plate includes a recess formed in an outer side face and having a inclined surface downwardly inclined from the outer side face toward the inside of said lower tie plate, and coolant flow resisting means is provided in said recess at a location below a point where said inclined surface starts inclining toward the inside of said lower tie plate.

16. A fuel assembly according to claim 15, wherein said coolant flow resisting means is positioned to be set back from the outer side face toward the inside of said lower tie plate.

17. A fuel assembly according to claim 15, wherein the dimension between a portion of the inner peripheral surface of each outermost one of said coolant openings, which is nearest to the outer side face of said lower tie plate, and said outer side face is smaller than a thickness of a side wall of said lower tie plate.

18. A fuel assembly according to claim 15, wherein the dimension between a portion of the inner peripheral surface of each outermost one of said coolant openings, which is nearest to the outer side face of said lower tie plate, and the center axis of said lower tie plate is larger than the dimension between an inner side face of said lower tie plate and the center axis of said lower tie plate.

19. A fuel assembly according to claim 15, wherein said lower tie plate has a plurality of fuel rod attachment openings into which the lower ends of said fuel rods are inserted, respectively, and each outermost one of said coolant openings is positioned at its part outwardly of outermost ones of said fuel rod insertion openings.

20. A fuel assembly according to claim 1, wherein said each outermost one of said coolant openings comprises one portion which is positioned outwardly of outermost ones of said fuel rod insertion openings, and the outer portion which is positioned between adjacent twos of said outermost fuel rod insertion openings, said one portion having a horizontal width greater than that of said the other portion.

21. A fuel assembly comprising a plurality of fuel rods each having an upper end and a lower end, and a lower tie plate for supporting the lower ends of said fuel rods and having a plurality of coolant openings through which a coolant is supplied to spaces between said fuel rods, wherein said lower tie plate includes a recess formed in an outer side face and having an inclined surface downwardly inclined from the outer side face toward the inside of said lower tie plate, and said recesses provided in each pair of two opposite outer side faces of said lower tie plate are different in shape from each other.

22. A fuel assembly comprising a plurality of fuel rods each having an upper end a lower end, and a lower tie plate for supporting the lower end of said fuel rods and having a plurality of coolant openings through which a coolant is supplied to spaces between said fuel rods, said tie plate including two pair of spaced outer side faces, with the respective side faces of each of said two pair being disposed in opposition to each other, wherein a recess is formed in only one of each pair of two oppositely disposed outer side faces of said lower tie plate, and wherein said recess includes an inclined surface inclined downwardly from the respective outer side surface to the inside of said lower tie plate.

23. A fuel assembly comprising a plurality of fuel rods each having an upper end and a lower end, and a lower tie plate for supporting the lower ends of said fuel rods and having a plurality of coolant openings through which a coolant is supplied to spaces between said fuel rods, wherein said lower tie plate includes a recess formed in an outer side face and having an inclined surface downwardly inclined from the outer side face toward the inside of said lower tie plate, and said recesses are provided in each pair of two opposite outer side faces of said lower tie plate at different positions from each other.

* * * * *